US009251772B2

(12) United States Patent
Hungate

(10) Patent No.: US 9,251,772 B2
(45) Date of Patent: Feb. 2, 2016

(54) INSTRUMENT CASE

(71) Applicant: Eric Hungate, Austin, TX (US)

(72) Inventor: Eric Hungate, Austin, TX (US)

( * ) Notice: Subject to any disclaimer, the term of this patent is extended or adjusted under 35 U.S.C. 154(b) by 0 days.

(21) Appl. No.: 14/626,662

(22) Filed: Feb. 19, 2015

(65) Prior Publication Data

US 2015/0294657 A1 Oct. 15, 2015

Related U.S. Application Data

(63) Continuation of application No. 29/495,645, filed on Jul. 2, 2014.

(60) Provisional application No. 61/977,479, filed on Apr. 9, 2014.

(51) Int. Cl.

| | |
|---|---|
| ***G01G 7/00*** | (2006.01) |
| ***A45C 11/00*** | (2006.01) |
| ***G10G 7/00*** | (2006.01) |
| ***B65D 25/10*** | (2006.01) |
| ***B65D 25/22*** | (2006.01) |
| ***B65D 25/28*** | (2006.01) |
| ***B65D 43/02*** | (2006.01) |
| ***B65D 81/02*** | (2006.01) |

(52) U.S. Cl.
CPC ................ *G10G 7/005* (2013.01); *B65D 25/10* (2013.01); *B65D 25/22* (2013.01); *B65D 25/28* (2013.01); *B65D 43/02* (2013.01); *B65D 81/022* (2013.01)

(58) Field of Classification Search
USPC .................................................... 206/314, 14
See application file for complete search history.

(56) References Cited

U.S. PATENT DOCUMENTS

| | | | | |
|---|---|---|---|---|
| 5,590,771 | A * | 1/1997 | Cota | 206/314 |
| 6,029,804 | A * | 2/2000 | Flynn | 206/14 |
| 6,283,287 | B1 * | 9/2001 | Carl | 206/314 |
| 6,462,260 | B2 * | 10/2002 | Fediakov | 84/327 |
| 6,598,772 | B1 * | 7/2003 | Wilfer | 224/629 |
| 6,670,536 | B2 * | 12/2003 | Godin et al. | 84/453 |
| 6,951,280 | B1 * | 10/2005 | Lee | 206/314 |
| 2004/0217026 | A1 * | 11/2004 | Neilson | 206/314 |
| 2012/0024728 | A1 * | 2/2012 | Sauter et al. | 206/314 |
| 2013/0327662 | A1 * | 12/2013 | Loban | 206/314 |

* cited by examiner

*Primary Examiner* — Jacob K Ackun
(74) *Attorney, Agent, or Firm* — William N. Hulsey, III; Jeffrey D. Hunt; Andrew Cook

(57) ABSTRACT

Methods, systems, and apparatus for the protection and transportation of musical instruments can include cases constructed of a semi-rigid and lightweight material to enable convenient transportation of the instrument and instrumental accessories, such as in internal and compartmentalized storage areas. Extendable/collapsible legs can enable the case to be placed in a standing position and to enable instruments to be retrieved and/or inserted while the case is in the standing position. The lid may be foldable over the front of the case or removed entirely from the case.

19 Claims, 42 Drawing Sheets

100

INSTRUMENT CASE

CROSS-REFERENCE TO RELATED APPLICATIONS

This application claims priority to U.S. Provisional Patent Application No. 61/977,479 filed Apr. 9, 2014, and U.S. Design Patent Application No. 29/495645 filed Jul. 2, 2014. All aforementioned applications are hereby incorporated by reference in their entirety.

BACKGROUND OF THE INVENTION

Musical instrument cases are traditionally limited to either a hard-shell case or a soft-shell bag.

Accordingly, there is a need in the art for an instrument case that combines the benefits of both conventional soft and hard-shell cases without either of these respective cases' limitations.

BRIEF SUMMARY OF THE INVENTION

According to the present disclosure, embodiments address limitations of both conventional soft and hard-shell musical instrument cases. According to embodiments, for example, a case provides benefits of both hard-shell case and soft-shell cases without associated limitations.

Traditional hard-shell cases can provide excellent protection and storage for instruments. However, these types of cases can be expensive, cumbersome, and are difficult to maneuver. Embodiments according to the present disclosure provide a case having improved cost, size, shape, balance, and maneuverability.

Typically, hard-shell cases include a hinged lid and are hinged on one side along the entire length of the case, such that the case must be laid down flat on a support before the case can be opened and the instrument can be safely stored or retrieved. Embodiments according to the present disclosure provide a case having a hinged lid, that is hinged for less than the entire length of the case, and that can be opened for the instrument to be safely stored or retrieved without requiring the case to be laid flat on a support. One of ordinary skill will understand that, as used herein, "safely" means without incurred risk that the lid will unexpectedly close, that the case will tip, close, or move due to imbalance, or that the lid will contact the instrument in an unintended manner.

A problem associated with soft-shell bags is reduced protection compared to hard-shell cases. Soft-shell cases are typically less expensive than hard-shell cases. Soft shell cases are also less cumbersome and are more maneuverable. However, soft-shell cases do not provide the same level of protection that a hard-shell case provides. Therefore there is a relationship between the cost of a musical instrument and the usage of hard-shell cases. Embodiments according to the present disclosure provide a case having improved cost and protection.

By the nature of their construction, soft-shell cases do not have structural support, and therefore whilst an instrument can be retrieved and placed within a soft-shell case whilst it is in a standing position, the case will promptly collapse thereafter. Embodiments according to the present disclosure provide a case having structural support, such that an instrument can be removed from the case in a standing position, and the case will not collapse when the instrument is removed therefrom.

Furthermore, existing cases, both hard-shell and soft-shell, do not typically contain designated and compartmentalized storage. This lack of compartmentalization limits potential organization, visibility, and the ease of access to a specific item. Embodiments according to the present disclosure provide a case having internal storage space and at least one compartment for storage of items in addition to a musical instrument.

A further limitation of existing musical instrument cases and bags is the difficulty of transporting or carrying of the case. This difficulty arises from the fitting of only one handle and the inability of any fitted-carry straps to be configurable. Embodiments according to the present disclosure provide a case having fitted carry straps.

A further limitation of existing cases and bags includes the lack of internal storage for the transport of a musical instrument stand. Therefore, if a musical instrument stand is to be transported in addition to a musical instrument, users will typically need to utilize two separate carrying cases. Embodiments according to the present disclosure provide a case having internal storage space and at least one compartment for the transport of a musical instrument stand.

The present disclosure provides in embodiments a semi-rigid musical instrument case, hereafter case, which may be easily transported, may provide protection for an instrument, and additionally, may enable the placement or retrieval of an instrument whilst the case is in a standing/deployed position.

In embodiments, the streamlined semi-rigid structure of the apparatus bridges the gap between the traditional soft-shell bags and heavy hard-shell cases that are currently available. Embodiments may provide impact resistance inside and out, may be lightweight, and may include an open access handle for facilitating ease of carrying, and may be configured for attachment of one or more straps at numerous locations.

Embodiments of the present disclosure may include deployable legs for providing a means to access the case whilst standing. This configuration of the apparatus can also serve as a stable, easy-to-use protective stand for the instrument.

In embodiments of the present disclosure, the apparatus may be configured in a rectangular-oval design with a zipper connection between the front and back. This arrangement may allow the instrument to be placed in, or retrieved from, the top of the case whilst the case is standing, rather than laying the case on its side and opening in the traditional manner.

Embodiments of the present disclosure may enable an innovative, glove-like receptacle for an instrument in order to provide enhanced protection for the stored instrument.

Embodiments of the present disclosure may include a case with the top section designed to protect the neck and head of an instrument. Embodiments may allow for internal and configurable storage such as for cords, small sound pedals, and other instrumental accessories.

Embodiments of the present disclosure may include a case with a fitted rubber bottom, or boot, to facilitate a non-slip surface in contact with the ground when the apparatus is in a standing/deployed position.

Embodiments of the present disclosure may provide configurable accessory storage compartments. These compartments may include partitions defined in whole or in part by releasable fastener material such as, for example, hook and loop type fastener material (such as, for example, Velcro hook and loop fastener material). Embodiments of the releasable fastener partitions may be uniquely configurable to accommodate all the numerous shapes and sizes of various instrument accessories.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of illustrative embodiments when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

For the purposes of the present disclosure, the term musical instrument is intended to encompass all stringed instruments comprising a neck, head stock, and a body, examples thereof can include acoustic and electric guitars as well as violins, violas, cello, etc. Further embodiments of the present disclosure may also accommodate woodwind or additional electric instruments; however, it should be understood that embodiments usable within the scope of the present disclosure could be adapted for use with any instrument or similar object having a head, neck, and body or similar shape.

Figure 1:
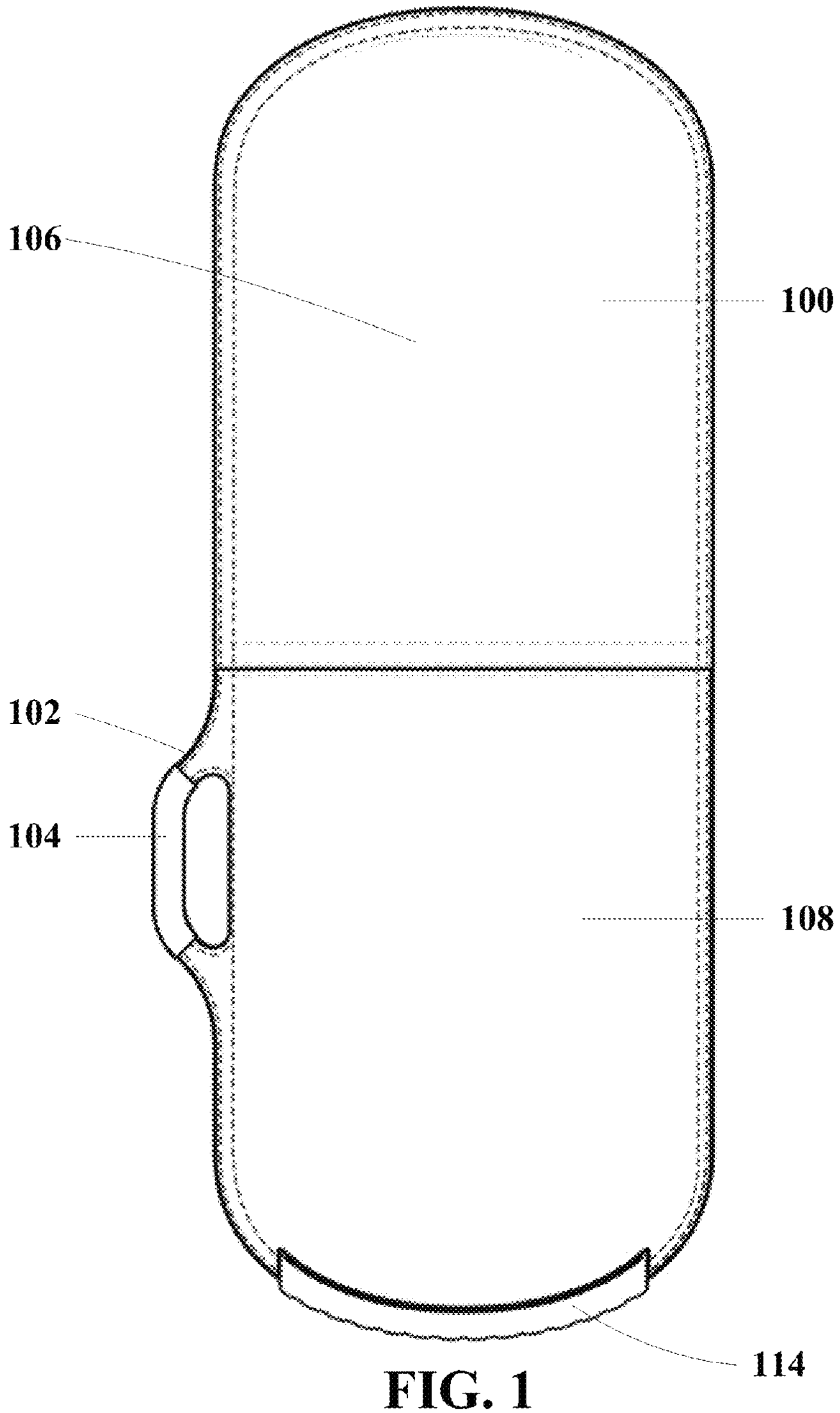
FIG. 1 presents an elevated perspective of an exemplary embodiment of the present disclosure.

FIG. 1 illustrates an embodiment of the present disclosure as a case 100 for the storage and transport of a musical instrument(s) from an elevated perspective. In this embodiment, the case is constructed of a semi-rigid layered material and comprises a back section 110 (shown in FIG. 2), an upper front section, or lid, 106 removably coupled by rivet inserts 142 to a lower front portion 108. The case may include a handle 102 with a grip 104 for providing one means by which the case can be lifted and transported. The embodiment shown in FIG. 1 may also include a rubber boot 114 on the base of the case to provide a non-slip surface and aid in the standing of the case.

In some embodiments, the base or back of the case 110 and the lower front portion 108 of case are constructed of a, or constructed into a, single piece. In further embodiments this single piece may also include the handle.

Figure 2:
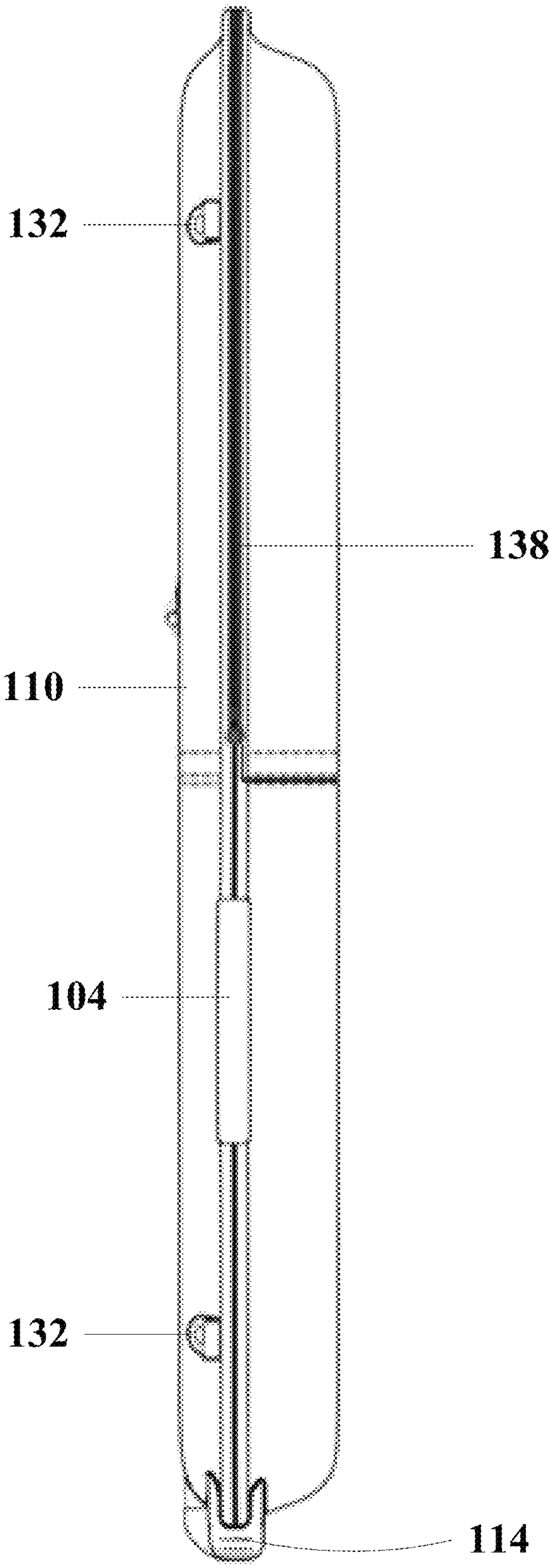
FIG. 2 presents a side perspective of an exemplary embodiment of the present disclosure.

FIG. 2 presents a side perspective of an exemplary embodiment of the present disclosure. The present perspective illustrates an exemplary zipper lining 138 between the lid 106 and the case backing. Also detailed in this embodiment are exemplary strap connectors 132 usable to engage straps to facilitate transport of the case.

Figure 3:
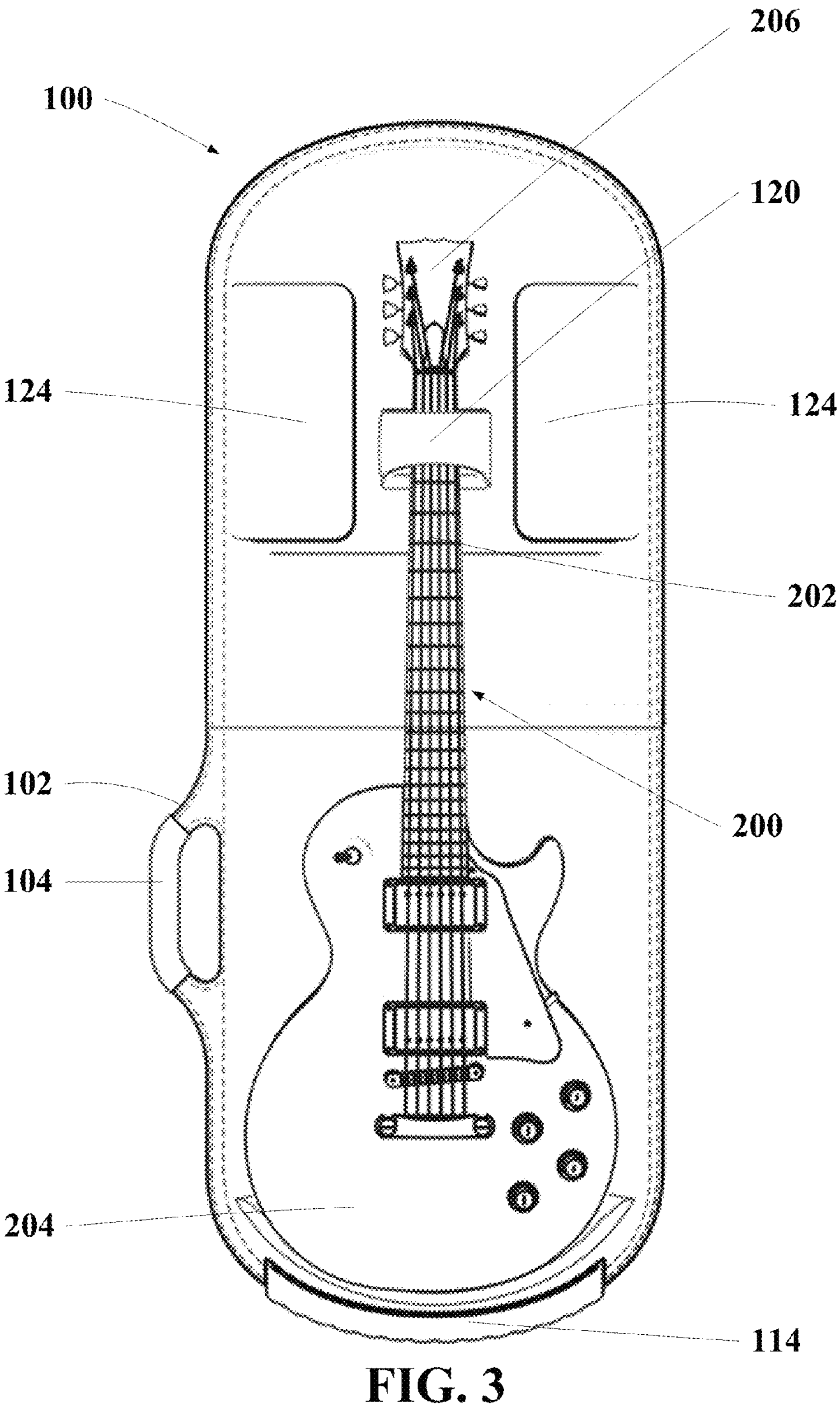
FIG. 3 presents an elevated perspective of an exemplary embodiment of the present disclosure with a semi-transparent top for viewing of an internal configuration.

FIG. 3 presents a further illustration of the present embodiment with a semi-transparent top for the purposes of illustrating an exemplary internal configuration. In the arrangement shown, the case accommodates an example of a musical instrument, shown as a guitar 200, which has a neck 202, a head 206, and a body 204.

In this embodiment, a musical instrument can be held in place by virtue of a neck holder 120. In embodiments, the upper portion of the neck holder 120 may be affixed to the base on separate sides. The head 206 and neck 202 of the guitar may then slide through an opening created by the upper portion of the neck holder 120. In embodiments, the upper portion of the neck holder 120 may be detachable on one or both sides. Affixing means for one or both sides are not limited and may include means such as, but not limited to, hook and loop closures, buttons, snap buttons, male and female attachments, etc. For the purposes of this disclosure, the term "upper portion of the neck holder" refers to the portion of the neck holder 120 that arches over the neck 202 of the guitar.

In a further embodiment of the present disclosure, the case 100 includes a fixed dense foam neck cradle for accommodating the neck of a musical instrument in order to protect and hold the musical instrument in place. Further embodiments may also include an adjustable Velcro strap for securing the neck of the musical instrument onto the cradle for added security.

Embodiments of the present disclosure may also include lining along the bottom section of the case to provide further protection. One embodiment utilizes an impact resistant gel foam pocket.

FIG. 3 further illustrates an exemplary case having internal compartments 124 positioned on either side of the neck of the stored musical instrument. Further embodiments of the case may include these internal compartments on both the front and back interiors of the case.

Figure 4A:
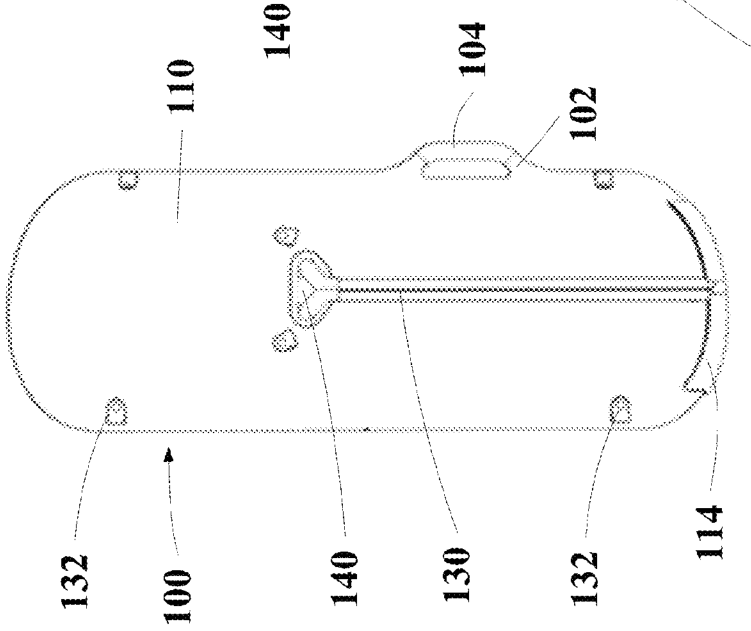
FIG. 4A presents a back perspective of an exemplary embodiment of the present disclosure in an undeployed position.
Figure 4B:
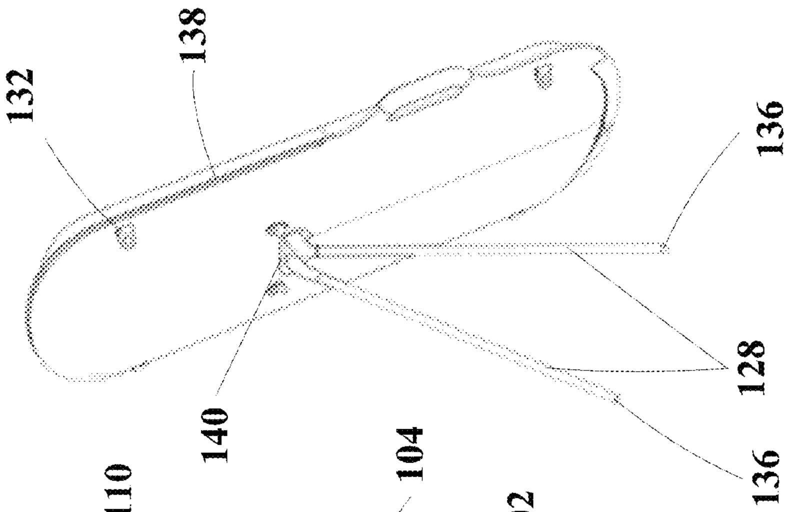
FIG. 4B presents a back perspective of an exemplary embodiment of the present disclosure in a deployed position.

FIGS. 4A and 4B present an embodiment of the present disclosure from a back or rear perspective. As shown, the back section of the case 110 may be constructed as a single piece. The base of the case may be fitted with a plurality of strap attachments 132, which allow a strap to be attached, thus providing a further means of lifting and transporting the case. Furthermore, FIGS. 4A and 4B detail one exemplary arrangement by which the present disclosure is able to stand. As shown, the present embodiment provides two deployable legs, which transition between a collapsed position 130 and an extended 128 position. In the embodiment depicted, the legs are operable by virtue of the hinge attachment 140 located on the case. The legs in the collapsed position can be located within a corresponding recess positioned on the base of the case. Further embodiments of the present disclosure may include a grip attachment 136 on the base of each leg.

Figure 5B:
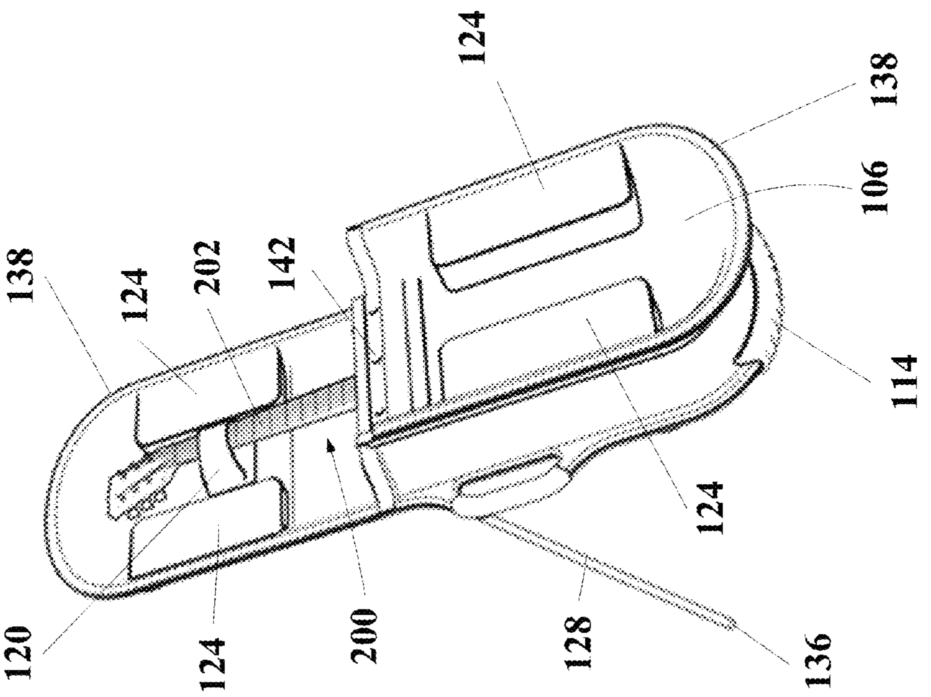
FIG. 5B presents an exemplary embodiment of the present disclosure in a standing/deployed configuration with an open and attached lid.
Figure 5A:
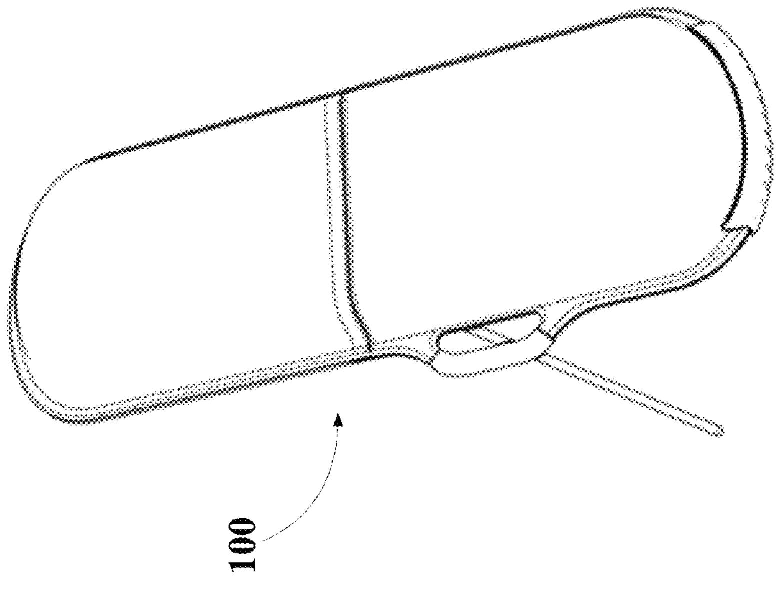
FIG. 5A presents an exemplary embodiment of the present disclosure in a standing/deployed configuration with a closed and attached lid.

FIG. 5A illustrates a front perspective of an embodiment in a standing/deployed position with a closed lid.

In contrast, FIG. 5B presents a further embodiment of the case again in a standing position, but now with lid open and folded forwards. In the embodiment shown, the casing has a first connection between the back of the case and the lid 106, as well as a second connection between the lid 106 and the lower front portion of the case. Embodiments having this arrangement allow the lid 106 to be separated from the back of the case, whilst maintaining a connection to the front of the case.

In one embodiment of the present disclosure, the connection between the back of the case and the lid is a "Round Top" zipper. In this arrangement, the connection zips around the top half of the body of the case. Embodiments having this arrangement include a detachable lid 106 that can fold forward when unzipped and can be removed entirely from the case making the bottom section a protective glove-like standing receptacle into which the instrument can be inserted.

In one embodiment, rivet inserts 142 provide a connection between the lid and the lower portion of the front of the case.

Accordingly, in the embodiment depicted the case can have the lid closed, can have the lid open and folded forwards over the front portion of the case, or, can have the lid entirely removed.

The embodiment shown in FIG. 5B also illustrates exemplary internal compartments 124 that are located on the lid as well as the back of the case 100. In a further embodiment of the present disclosure, embodiments include matable, adjustably positionable stripping, or adjustably positionable mating strips, having respective mating components including releasable fastener material, and this allows for attachable padded partitions. It will be understood that the releasable fastener material may be, for example, hook and loop type fastener material commonly called Velcro, or any other suitable releasable fastener material having mating components. The inclusion of such stripping having releasable fastener material stripping enables these padded partitions to be configured to accommodate accessory bags of various sizes within the compartments.

Figure 6:
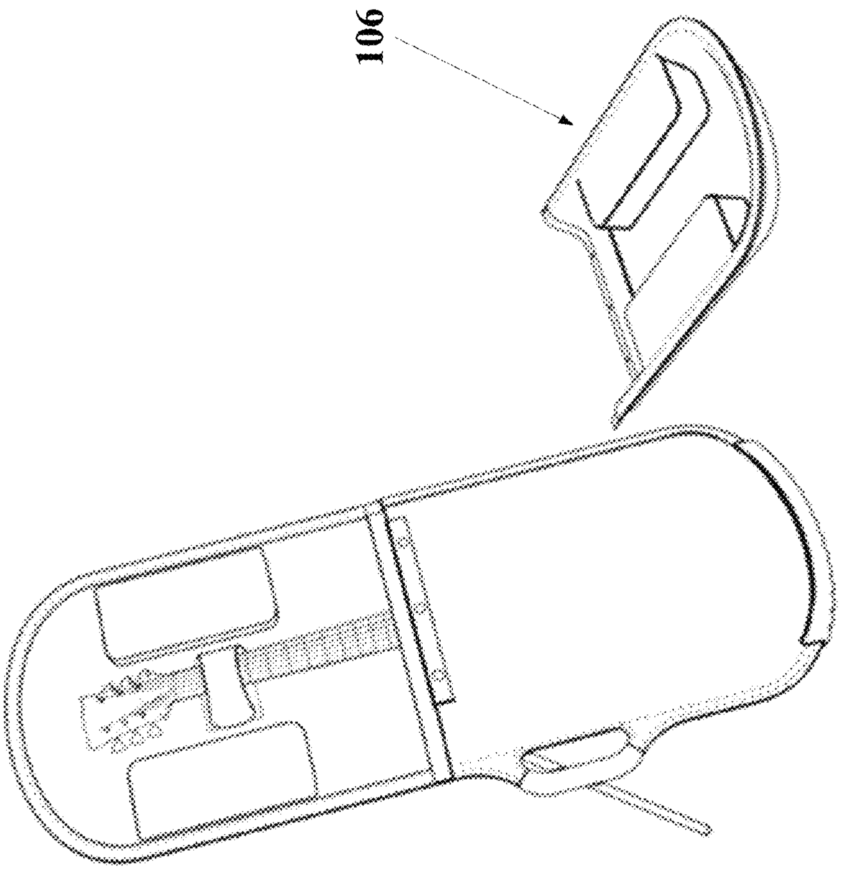
FIG. 6 presents an exemplary embodiment of the present disclosure in a standing configuration with an open and separated lid.

FIG. 6 illustrates an open case embodiment with the lid 106 separated from the case 100.

Figure 7:
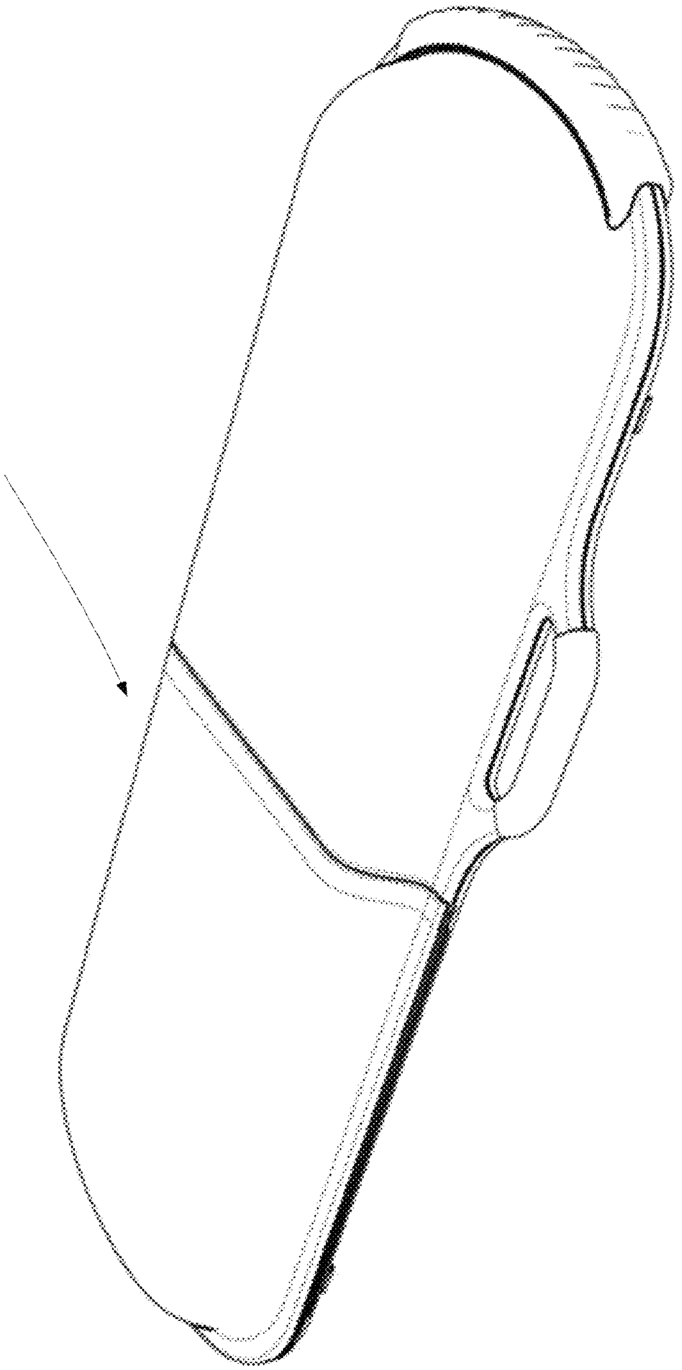
FIG. 7 presents an exemplary embodiment of the present disclosure from a side/top perspective.

FIG. 7 illustrates a further embodiment of the case once the lid has been re-attached to the case 100, the legs have been collapsed, and the case has been placed flat.

Figure 8:
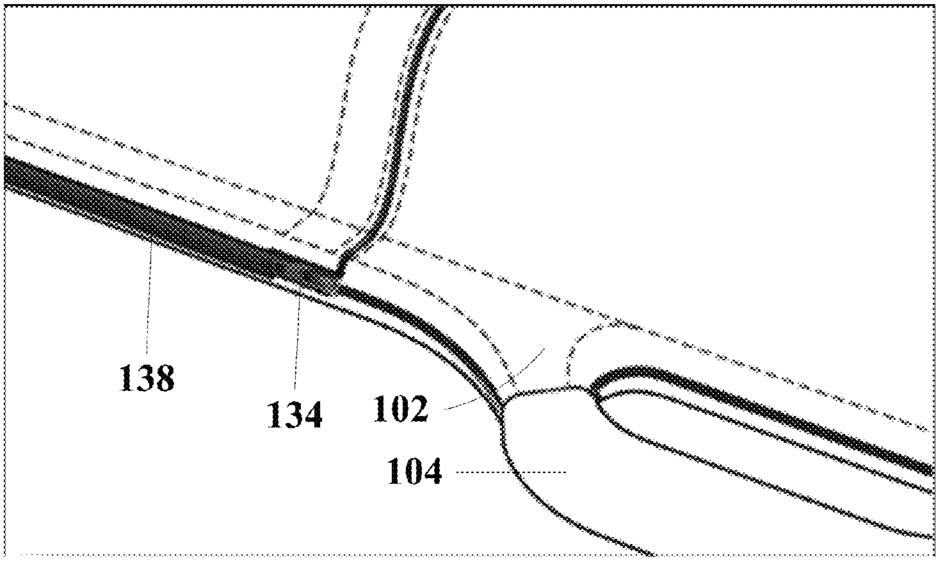
FIG. 8 presents a detailed view of an exemplary zipper connection.

FIG. 8 presents a detailed view of an exemplary zipper connection between the lid of the case, and the body, or back of the case. The exemplary arrangement shown includes a Zipper 134 and a zipper lining 138.

Figure 9:
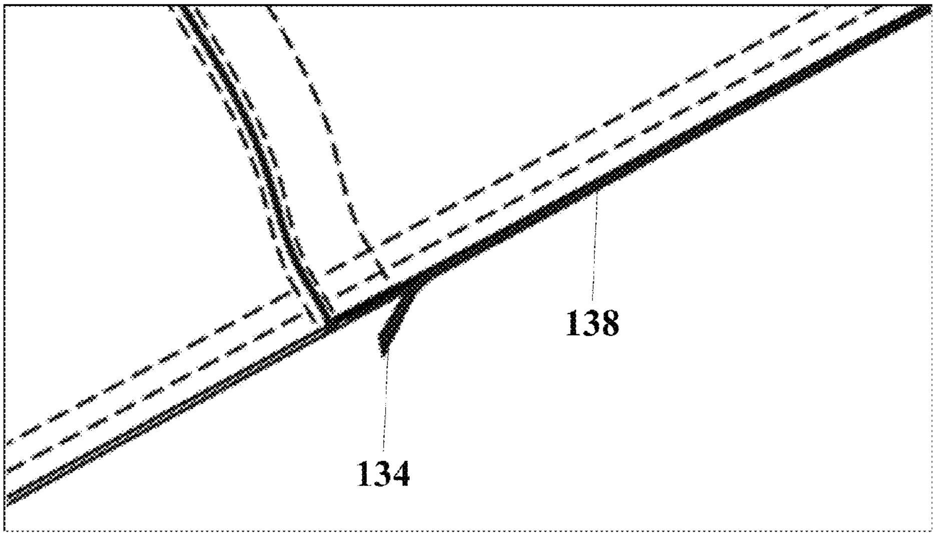
FIG. 9 presents a further detailed view of an exemplary zipper connection.

FIG. 9 presents a further detailed view of an exemplary zipper connection from the opposing side of the case that is detailed in FIG. 8.

Figure 10:
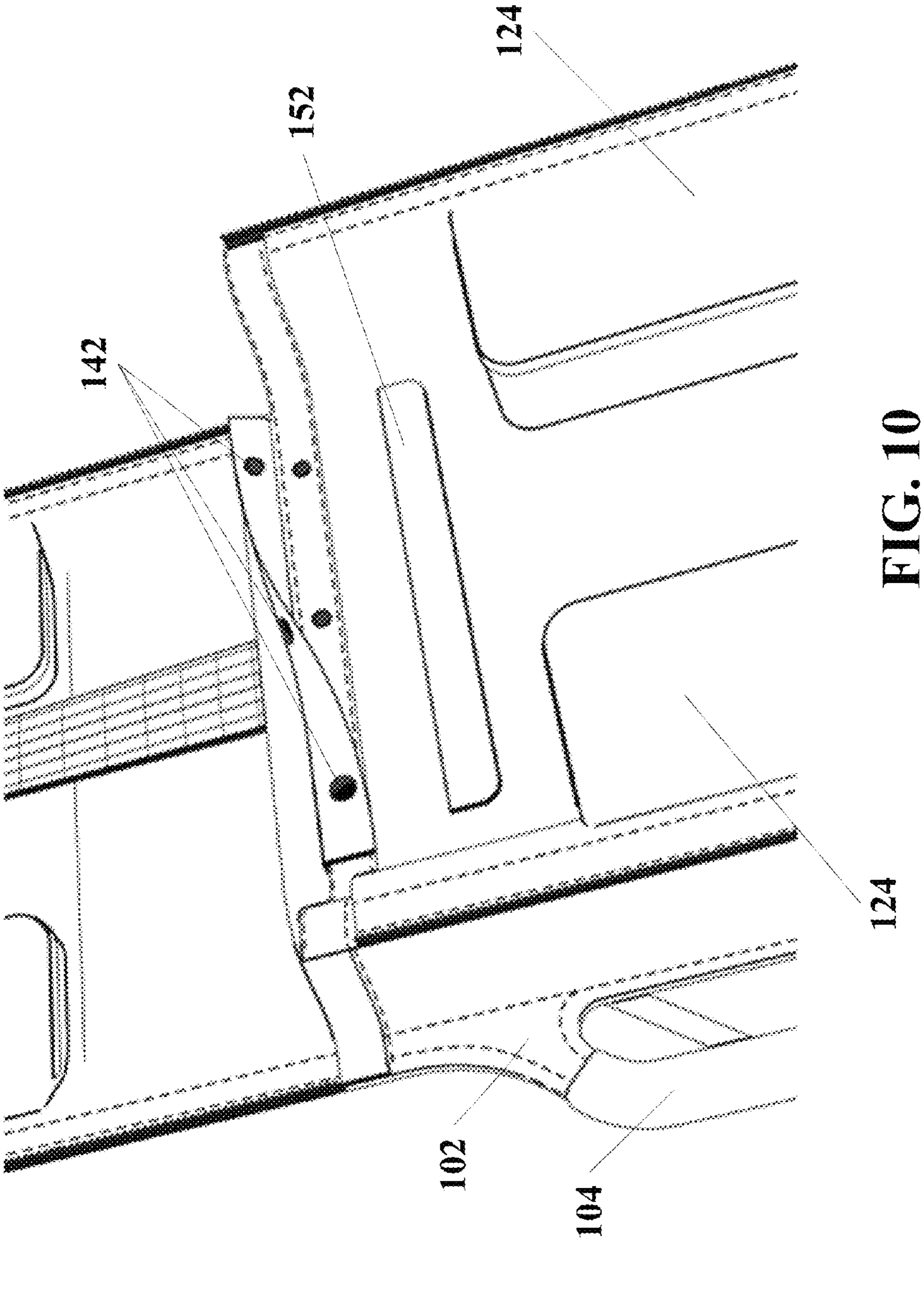
FIG. 10 presents a further detailed view of an exemplary rivet insert connection.

FIG. 10 presents a further detailed view of an exemplary rivet insert connection 142, which may form the connection between the lid 106, and the body of the case, and/or the lower front portion 108 of the case, if constructed as separate pieces. For the purposes of the present disclosure, the rivet connection between the lid and the body of the case is understood to include an exemplary embodiment, and any connection type allowing the free rotation of the lid relative to the body of the case can be used without departing from the scope of the present disclosure. Further embodiments of the present disclosure include the ability of the lid to be separated from the body of the case. Other embodiments of the present disclosure include a single connection between the case and the lid, wherein by operation of the lid, the lid can be separated from the body.

Figure 11:
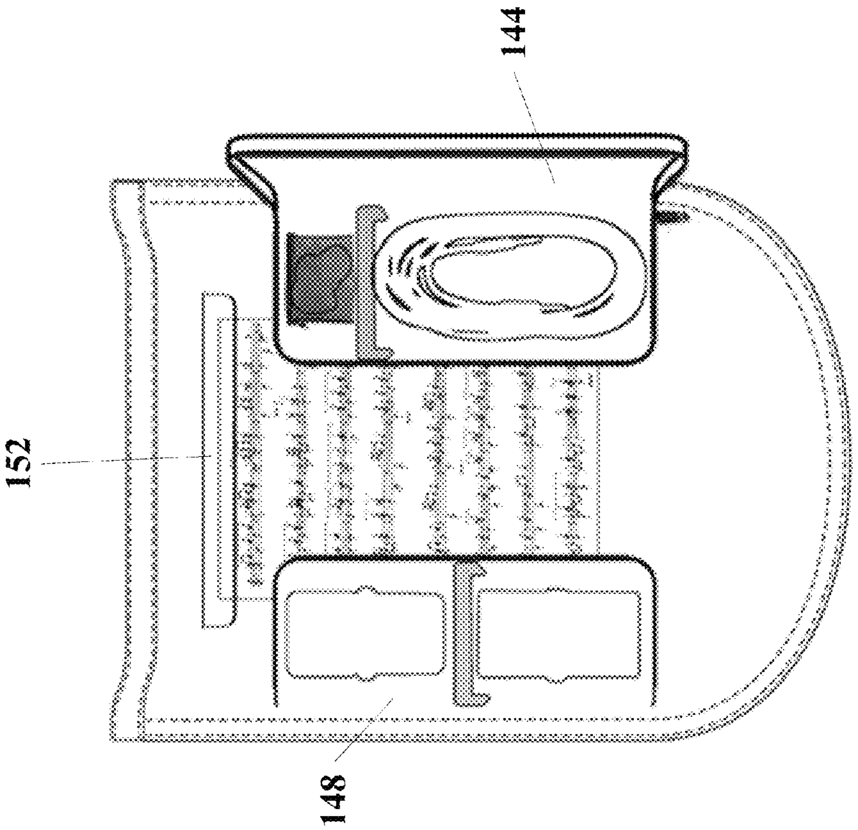
FIG. 11 presents a further detailed view of an exemplary separated lid.

FIG. 11 presents a further detailed view of an exemplary separated lid, and furthermore presents exemplary instrumental accessories that may be stored within the compartments 144, 148, 152.

Figure 12:
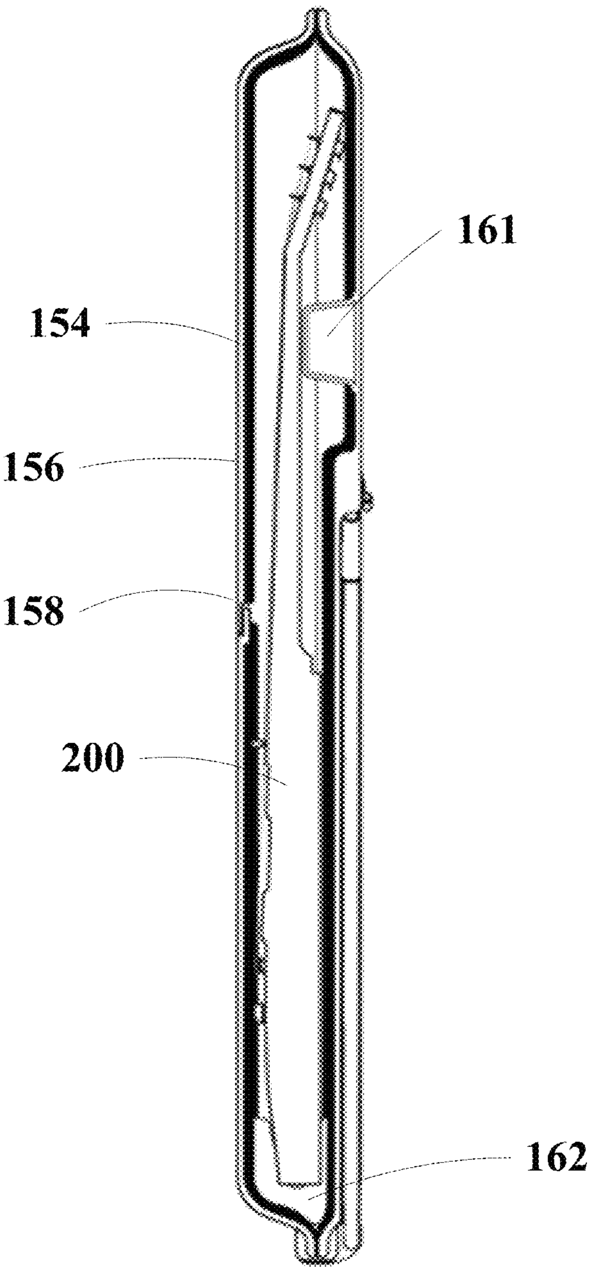
FIG. 12 presents a detailed cross-sectional view of an embodiment of the present disclosure.

FIG. 12 presents a detailed cross-sectional view of an embodiment of the present disclosure. As shown, one exemplary embodiment includes soft dense foam layer covered with plush lining along the interior of the case 154, EPE foam, molded EVA foam 156, with two front panels and one rear panel, and a black ballistic nylon outer covering 158. The above layer arrangement is an exemplary arrangement and is not intended to limit the scope of this disclosure. Other embodiments envisioned may include fewer or a greater number of layers, and substitutions, etc. without departing from the scope of the present disclosure. The example case presented also details a Molded EVA foam neck support 161. As shown, the case may also include a foam bottom cap with U-profile 162 for supporting the bottom of an instrument.

Figure 13B:
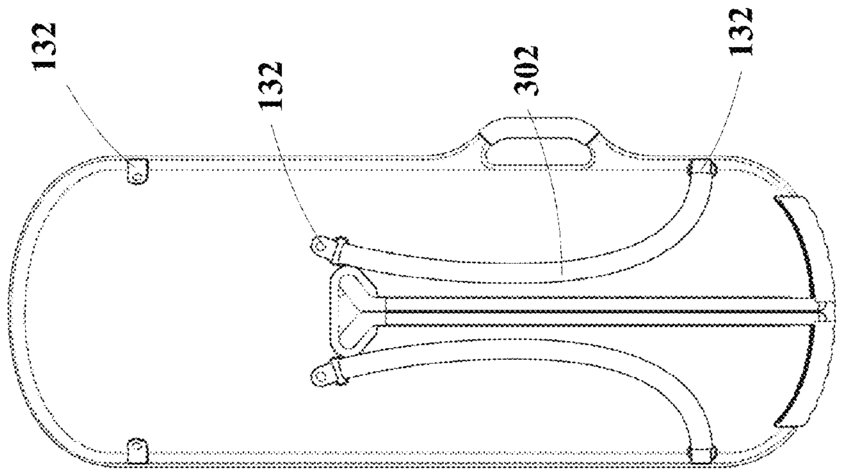
FIG. 13B presents embodiments of the present disclosure with the inclusion of removable straps.
Figure 13A:
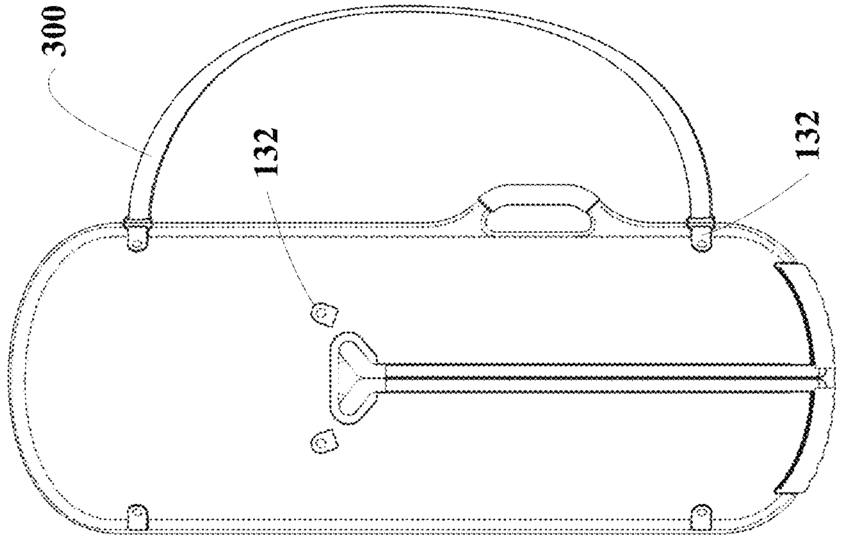
FIG. 13A presents embodiments of the present disclosure with the inclusion of a removable strap.

FIG. 13A presents an embodiment of case 100 according to the present disclosure including removable strap 300. As shown, the case may be fitted with a plurality of strap attachments 132 in a variety of locations to which removable straps 300 may be fitted. FIG. 13B presents a second exemplary embodiment of case 300 including removable straps 302 which may be configured between selected strap attachments 132, including a sling arrangement and a twin shoulder or backpack arrangement of removable straps 132.

FIGS. 14-31 depict further perspectives of the present disclosure.

Figure 14C:
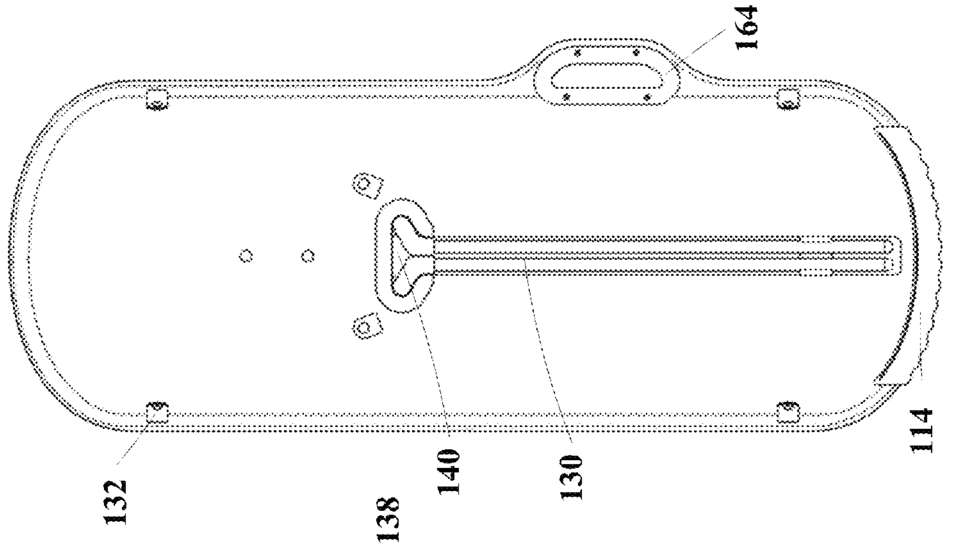
FIG. 14C presents a rear elevated perspective of an exemplary embodiment of the present disclosure.
Figure 14B:
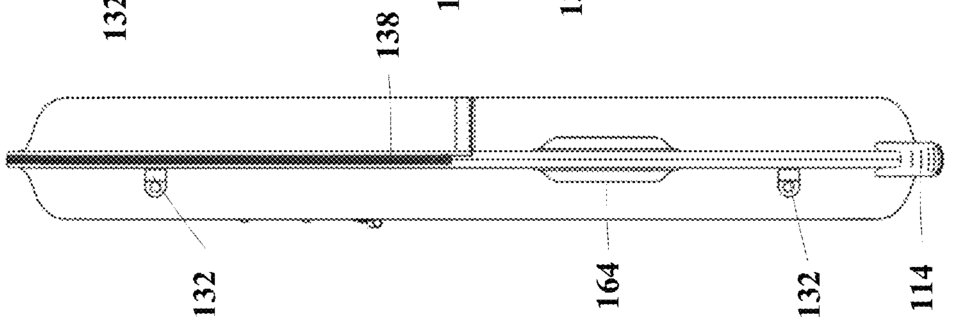
FIG. 14B presents a side perspective of an exemplary embodiment of the present disclosure.

FIG. 14B presents a side perspective of an exemplary embodiment of the present disclosure. The present perspective illustrates an exemplary zipper lining 138 between the lid 106 and the case backing. Also detailed in this embodiment are exemplary strap connectors 132 usable to engage straps to facilitate transport of the case, as well as the handle with reinforcement exterior layer 164.

FIG. 14C presents an arrangement for collapsible/extendable leg supports. In particular, in contrast to the arrangement shown in FIGS. 4A and 4B, in the embodiment depicted in FIG. 14C the collapsed legs 130 terminate slightly above the boot 114.

Figure 15A:
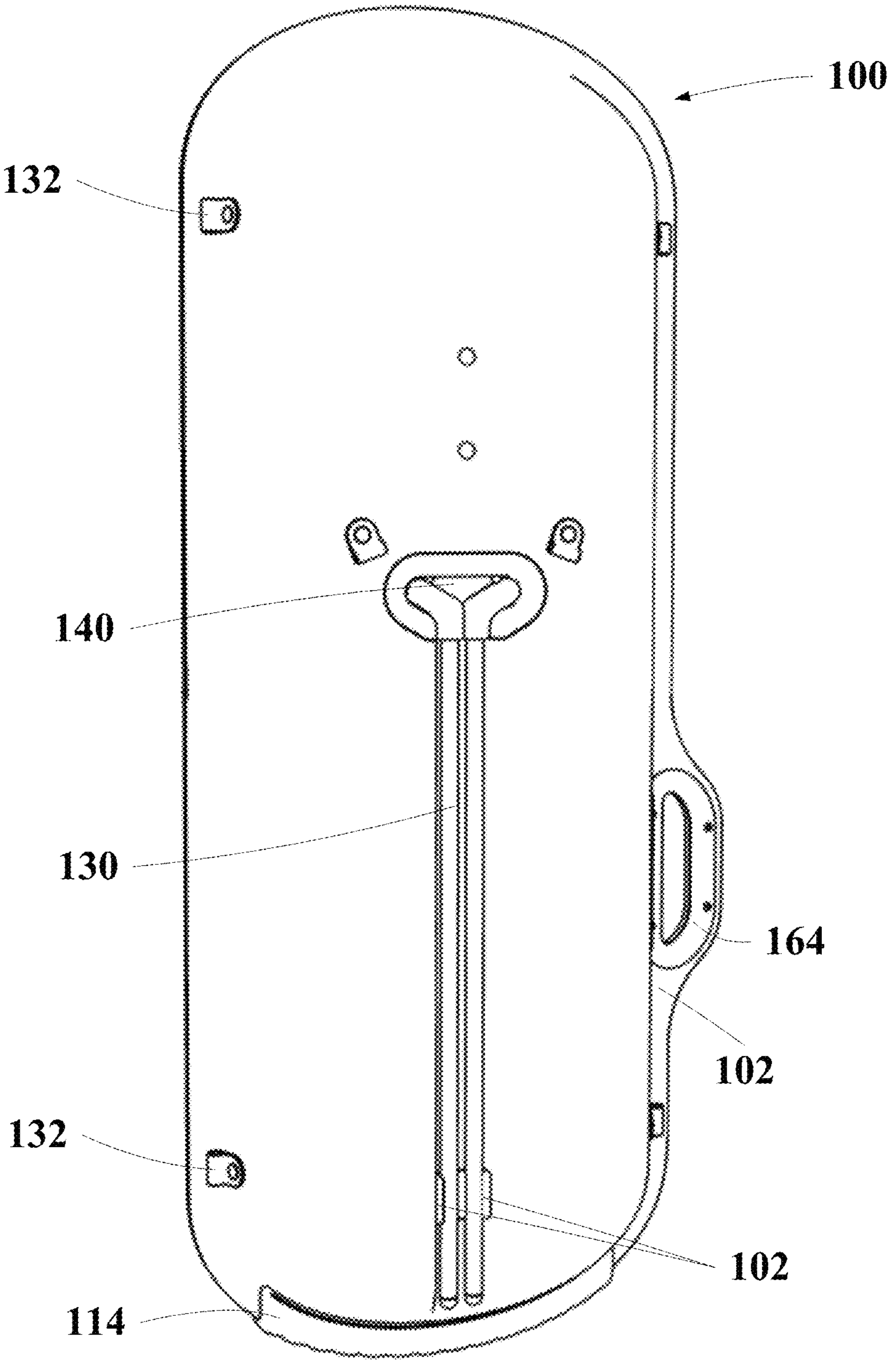
FIG. 15A presents a rear elevated angled perspective of an exemplary embodiment of the present disclosure.
Figure 15B:
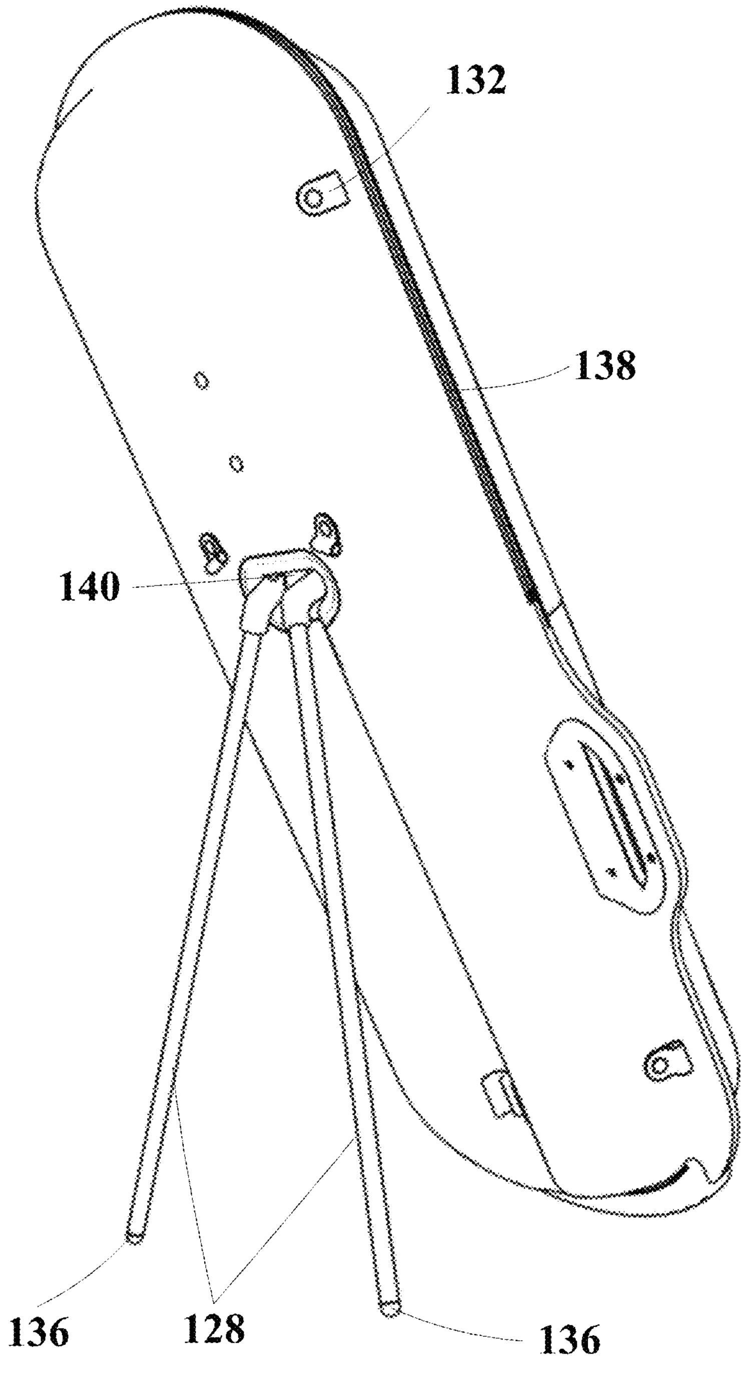
FIG. 15B presents a rear elevated angled perspective of an exemplary embodiment of the present disclosure resting on retractable legs.

FIG. 15A presents an alternative arrangement for collapsible/extendable leg supports. In particular, in contrast to the arrangement shown in FIGS. 4A and 4B, in the embodiment depicted in FIG. 15A the collapsed legs 130 terminate slightly above the boot 114. Furthermore, clasps 131 are provided within the recess and configured to receive and hold the legs 130 in the collapsed position. FIG. 15B presents a rear elevated angled perspective of an exemplary embodiment of the present disclosure resting on retractable legs 128.

Figure 14A:
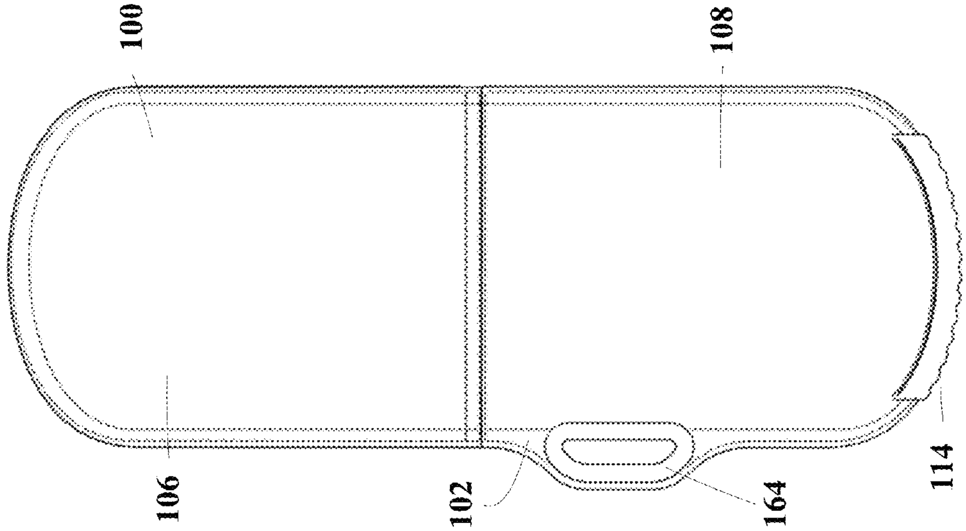
FIG. 14A presents a front elevated perspective of an exemplary embodiment of the present disclosure.

FIGS. 15A through 25 also depict an alternative handle arrangement. As shown in FIG. 14A, an alternative handle arrangement may be provided, which includes reinforcement along the interior.

Figure 16A:
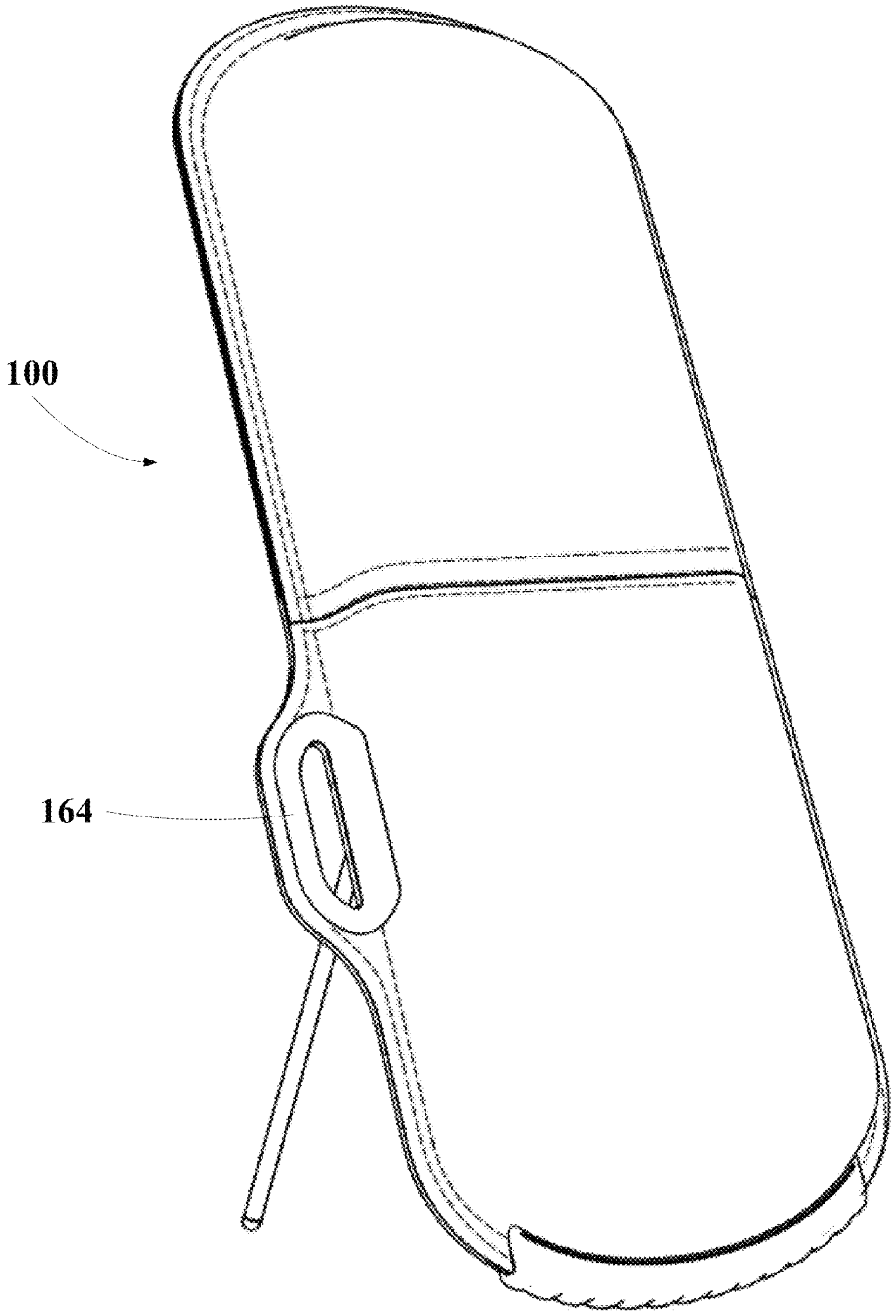
FIG. 16A presents an exemplary embodiment of the present disclosure in a standing configuration with closed and attached lid.
Figure 16B:
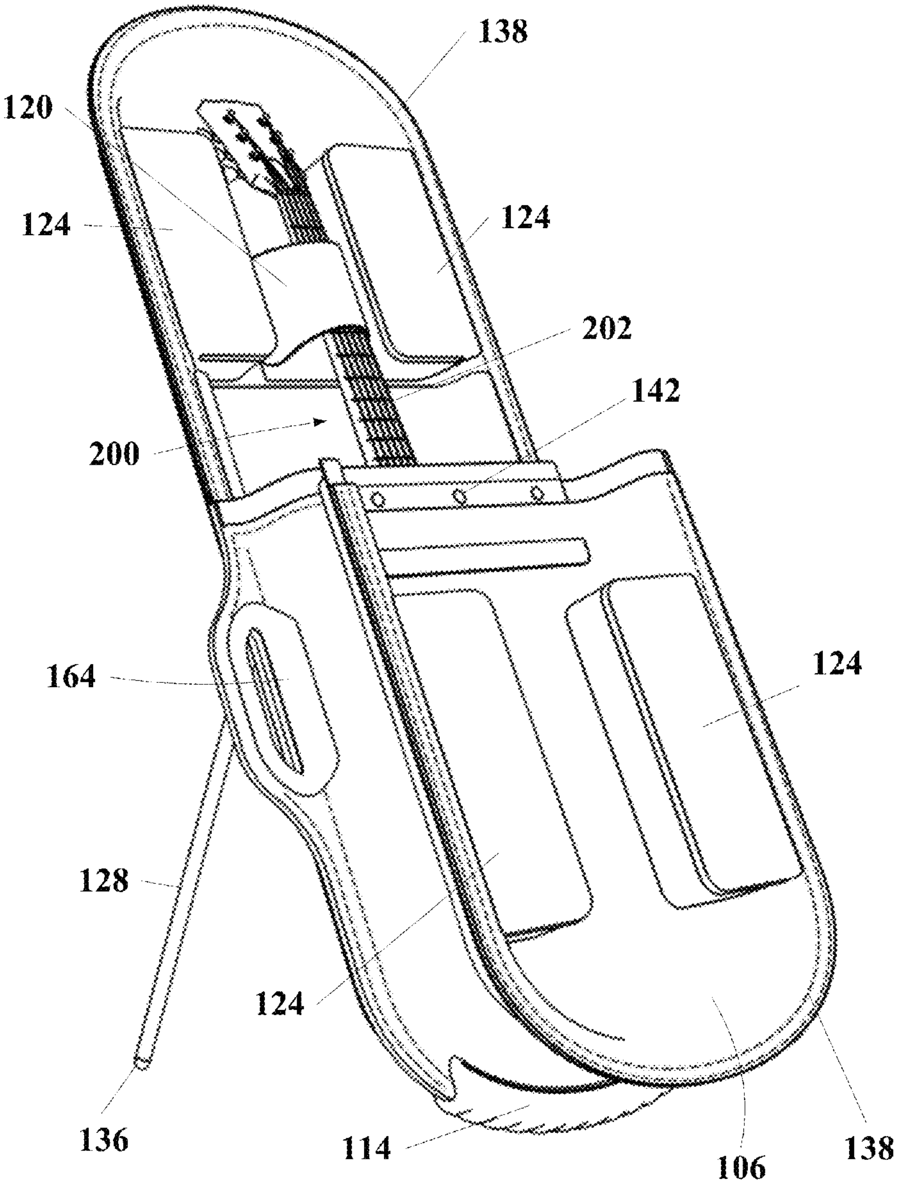
FIG. 16B presents an exemplary embodiment of the present disclosure in a standing configuration with an open and attached lid.

FIG. 16A presents an exemplary embodiment of the present disclosure in a standing configuration with closed and attached lid. This embodiment is similar to the embodiment found in FIG. 5A, but includes a handle with reinforcement exterior layer 164. FIG. 16B presents an exemplary embodiment of the present disclosure in a standing configuration with an open and attached lid 106.

Figure 17:
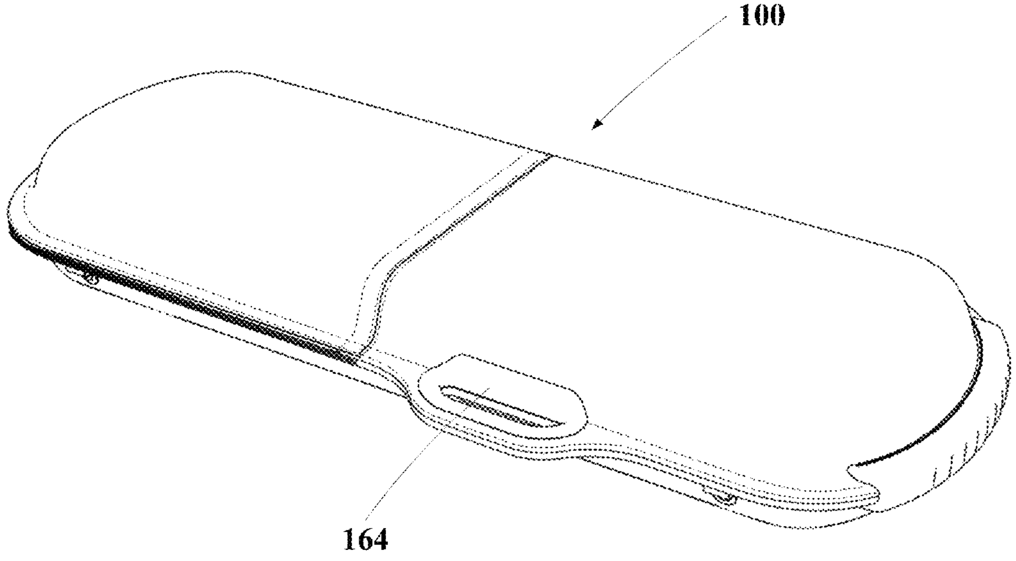
FIG. 17 presents an exemplary embodiment of the present disclosure from a side/top perspective.
Figure 18:
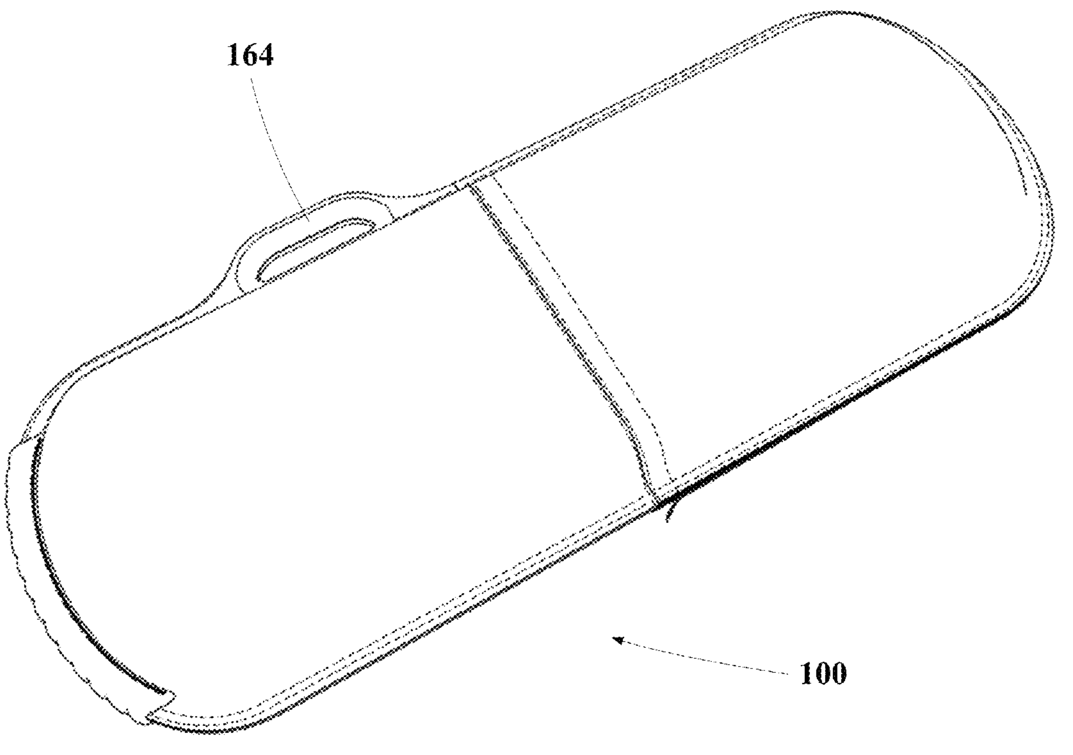
FIG. 18 presents an exemplary embodiment of the present disclosure from a side/top perspective.

FIG. 17 presents an exemplary embodiment of the present disclosure from a side/top perspective. This embodiment is similar to the embodiment in FIG. 7, but includes a handle with reinforcement exterior layer 164. FIG. 18 presents an exemplary embodiment of the present disclosure from a side/top perspective. This embodiment is similar to the embodiment found in FIG. 17, including the handle with reinforcement exterior layer 164.

Figure 19:
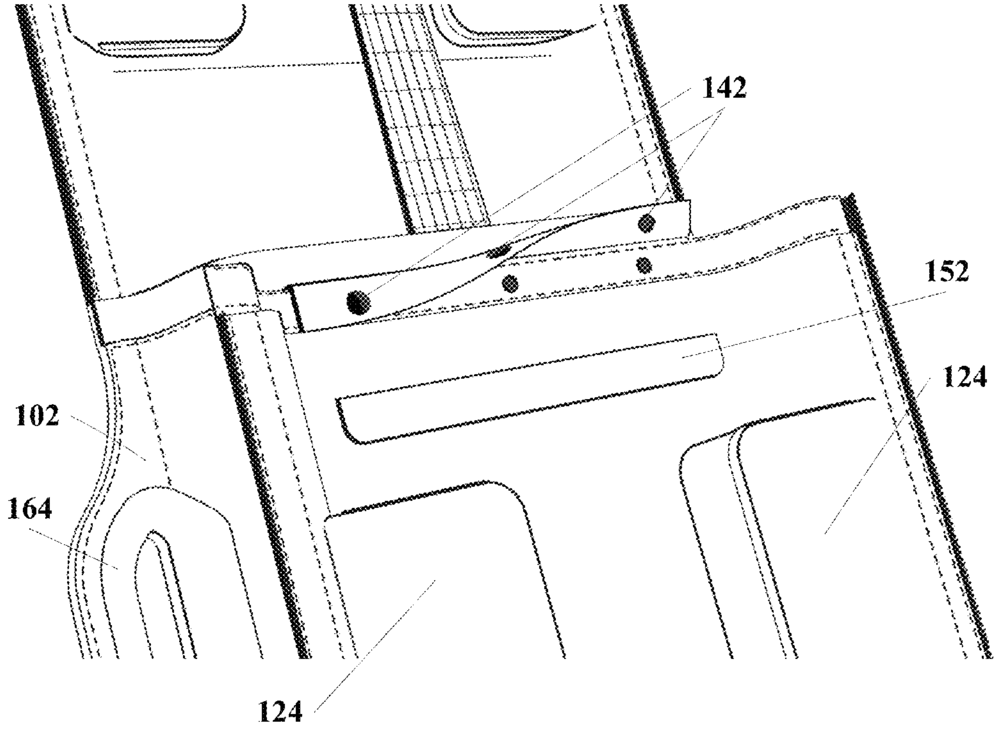
FIG. 19 presents a further detailed view of an exemplary rivet insert connection.

FIG. 19 presents a further detailed view of an exemplary rivet insert connection. This embodiment is similar to the embodiment found in FIG. 10, but includes a handle with reinforcement exterior layer 164.

Figure 20:
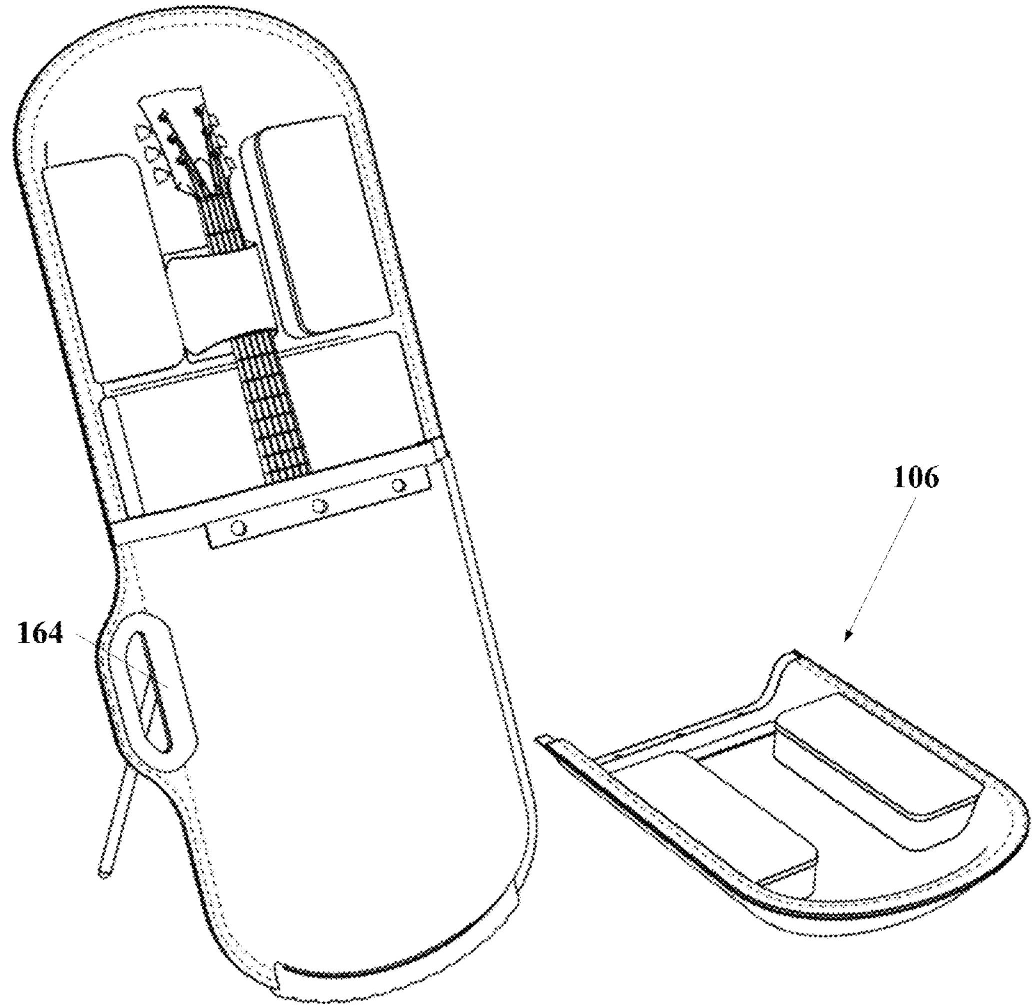
FIG. 20 presents an exemplary embodiment of the present disclosure in a standing configuration with an open and separated lid.

FIG. 20 presents an exemplary embodiment of the present disclosure in a standing configuration with an open and separated lid 106. This embodiment is similar to the embodiment found in FIG. 6, but includes a handle with reinforcement exterior layer 164.

Figure 21:
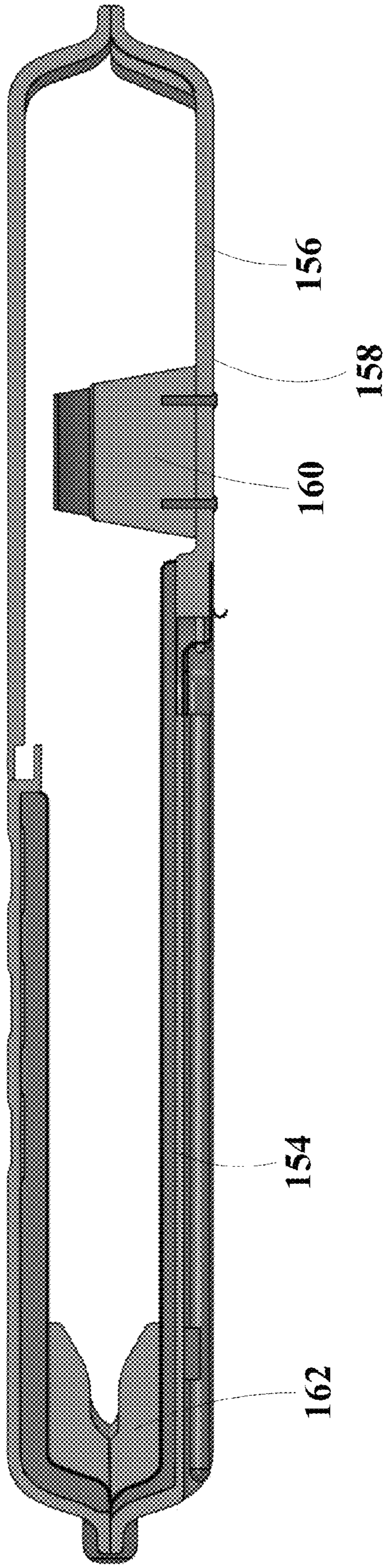
FIG. 21 presents a contrast perspective of the interior lining and partial cross-section view of an exemplary embodiment.

FIG. 21 provides a contrast perspective of the interior lining of an exemplary embodiment as well as a partial cross-section view. The embodiment depicted is lined with a slick surface 154 along the backing and front of the base of the case. This slick surface 154 facilitates the sliding of the guitar during placement and retrieval. In further embodiments, this slick surface 154 may be provided with ribs (or other structures) for guiding the guitar into the correct position when being placed.

FIG. 21 also depicts an embodiment having foam bottom cap 162 for receiving and protecting the base of the guitar.

Figure 22A:
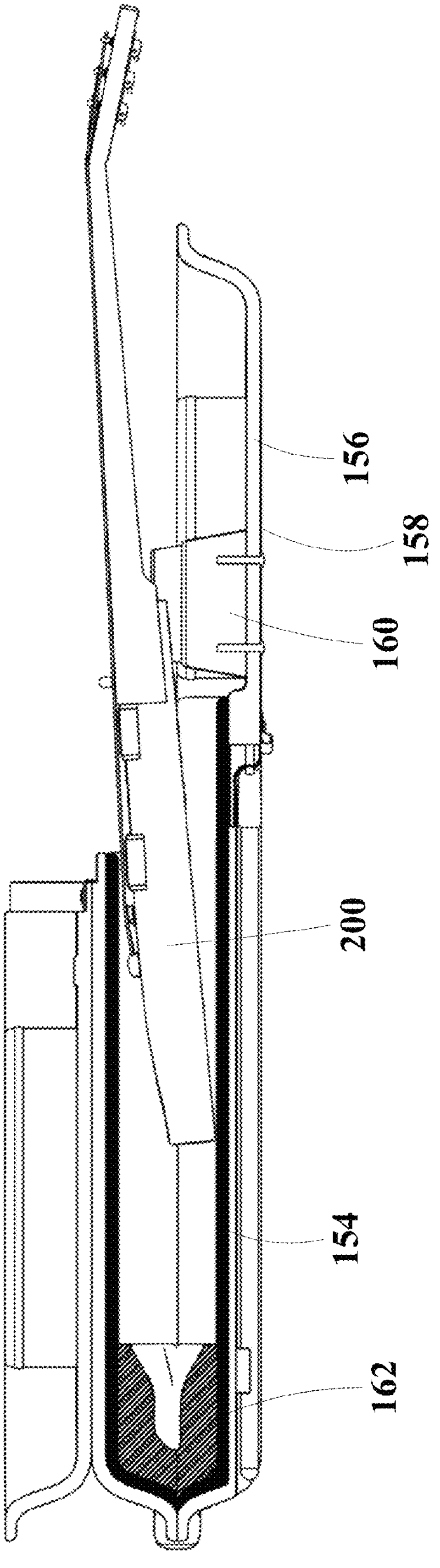
FIG. 22A presents a partial cross-section view of an exemplary embodiment of the present disclosure with a musical instrument partially inserted and with an open attached lid.
Figure 22B:
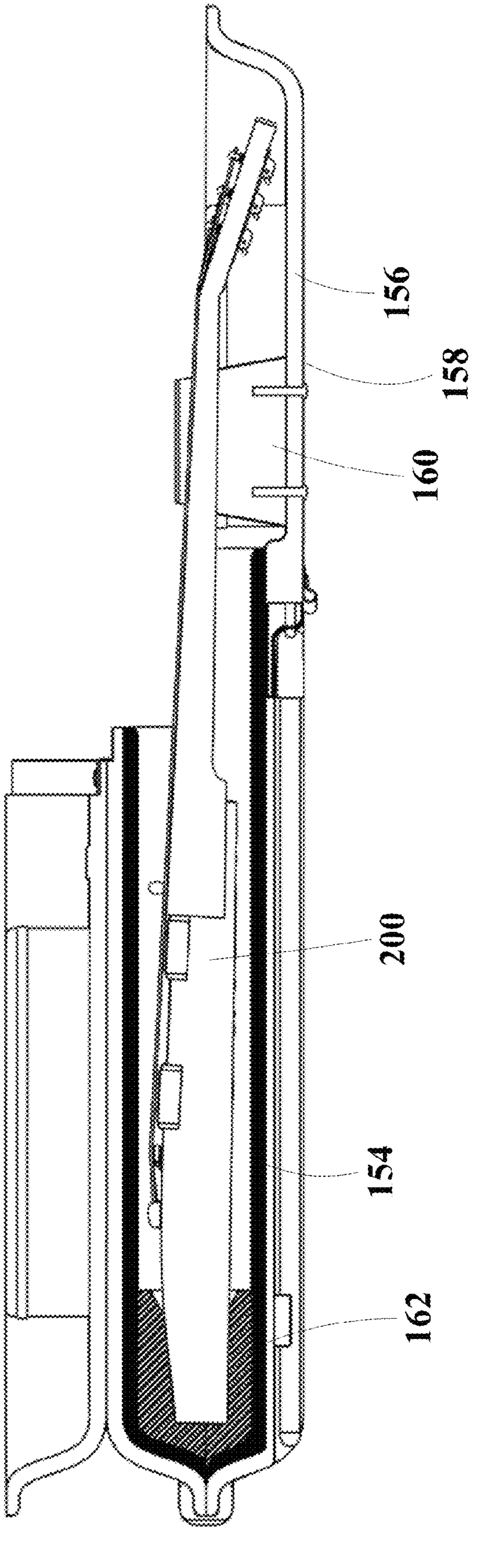
FIG. 22B presents a partial cross-section view of an exemplary embodiment of the present disclosure with a musical instrument fully inserted and with an open attached lid.
Figure 22C:
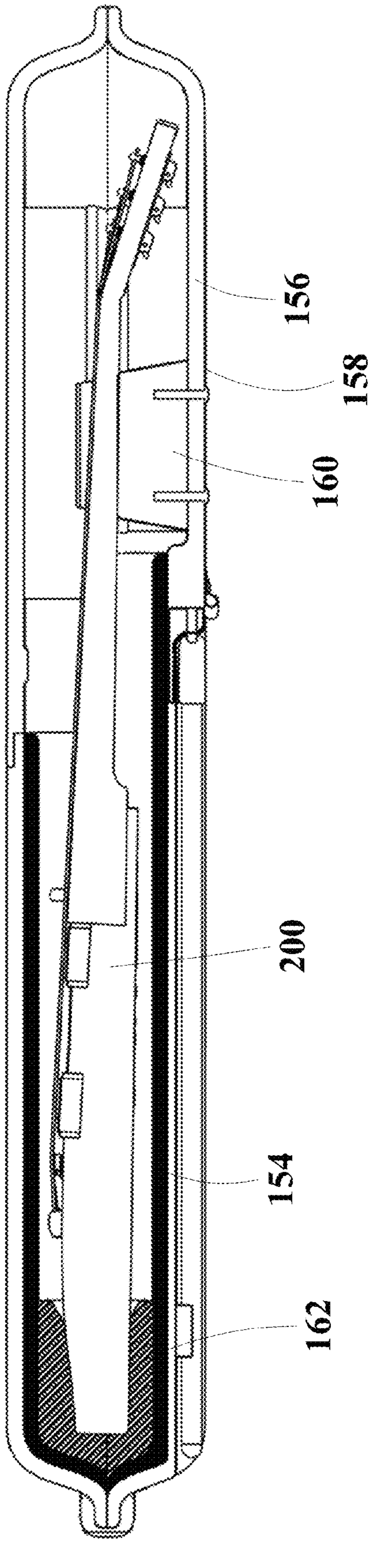
FIG. 22C presents a partial cross-section view of an exemplary embodiment of the present disclosure with a musical instrument fully inserted and with a closed attached lid.

FIG. 22A depicts an exemplary embodiment of the present disclosure as the guitar, or other instrument, is being placed into the case, including a partial cross-section view. As shown, the guitar slides over the slick surface lining 154 of the case until it is received by the foam bottom cap 162, as depicted in FIG. 22B. The neck of the instrument is then restrained using the neck restraint 160. The structure of the neck restraint 160 may be similar to neck holder 120 in one or more aspects and/or structures, including an upper portion and may provide similar functionality as neck holder 120. The case is then closed as depicted in FIG. 22C. In embodiments, the neck restraint 160 may be bolted to the case 100. It is noted that FIGS. 22A-22C are partial cross-section views.

Figure 23A:
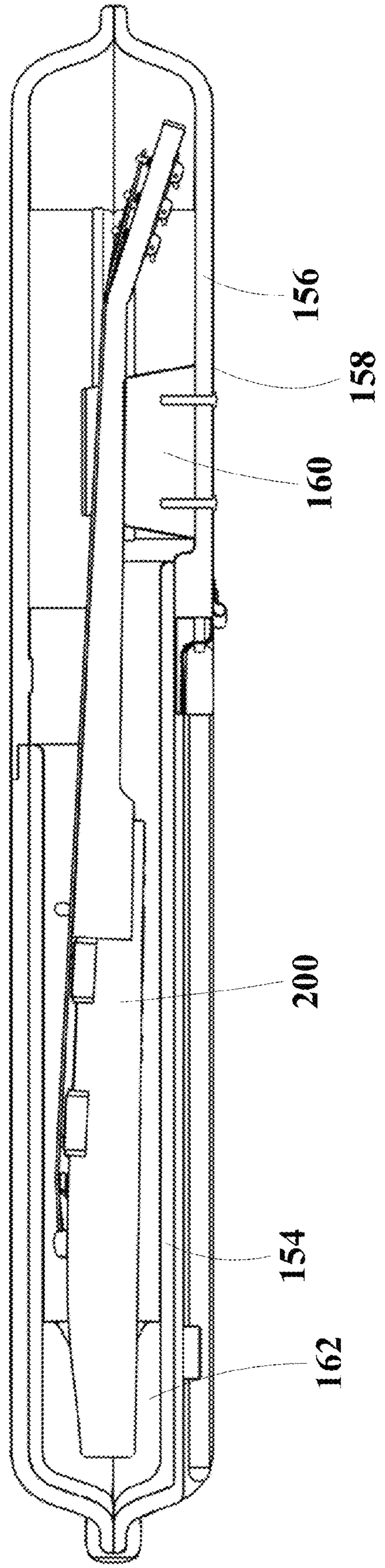
FIG. 23A presents a partial cross-section view of an exemplary embodiment of the present disclosure with a musical instrument fully inserted and with a closed attached lid.
Figure 23B:
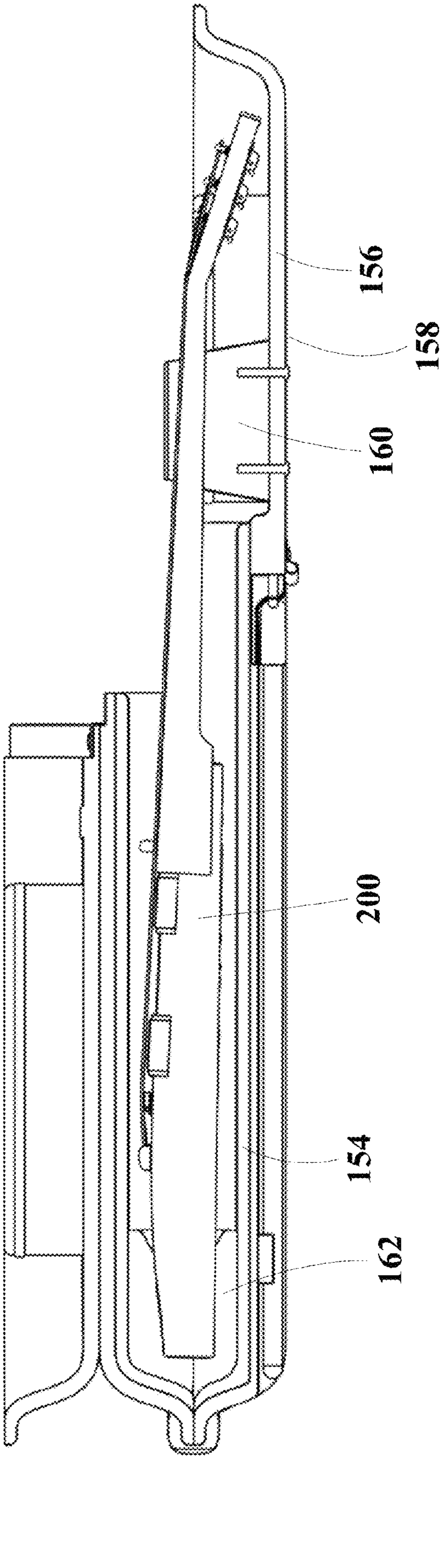
FIG. 23B presents a partial cross-section view of an exemplary embodiment of the present disclosure with a musical instrument fully inserted and with an open attached lid.
Figure 23C:
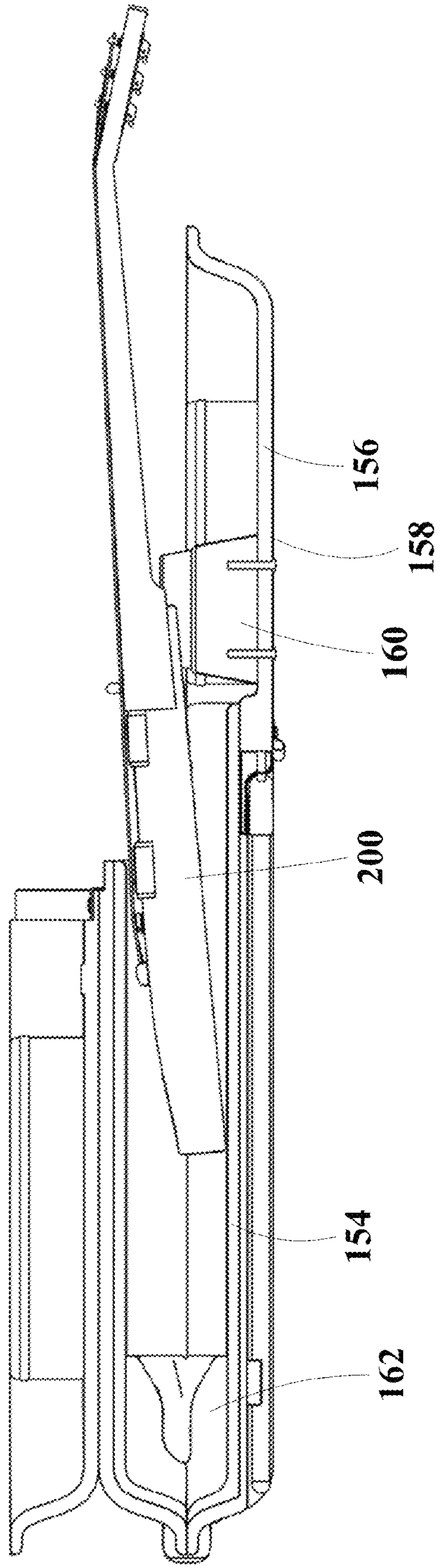
FIG. 23C presents a partial cross-section view of an exemplary embodiment of the present disclosure with a musical instrument partially inserted and with an open attached lid.
Figure 23D:
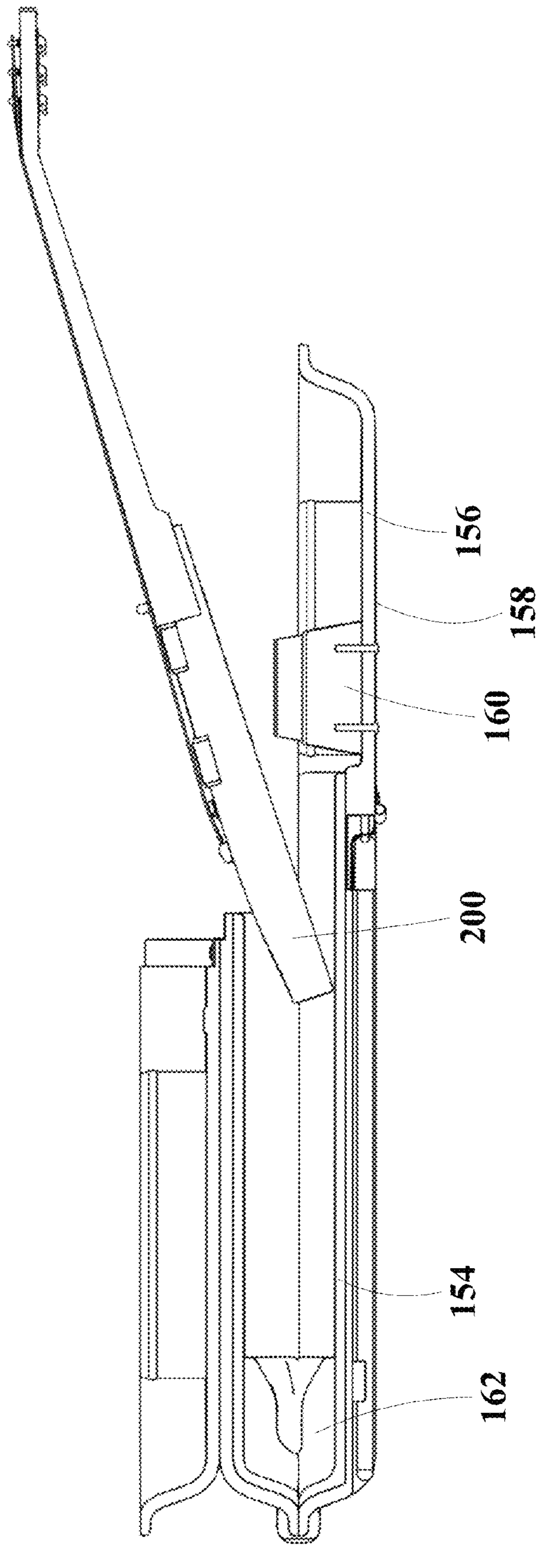
FIG. 23D presents a partial cross-section view of an exemplary embodiment of the present disclosure with a musical instrument partially inserted and with an open attached lid.

FIGS. 23A through 23D depict a second embodiment of the present disclosure without the contrast perspective, the removal of a guitar from the case, and a partial cross-section view. As shown, FIG. 23A illustrates a closed case, containing a guitar that is supported/restrained by the neck support 160, the foam bottom cap 162, and the structure of the case. FIG. 23B depicts the case 100 in an open position in preparation for removal of the guitar. FIG. 23C depicts the guitar being removed from the case 100, and the gradual sliding and removal of the guitar from the case 100. FIG. 23D depicts the guitar having been slid from within the lower section being lifted from the case 100.

Figure 24A:
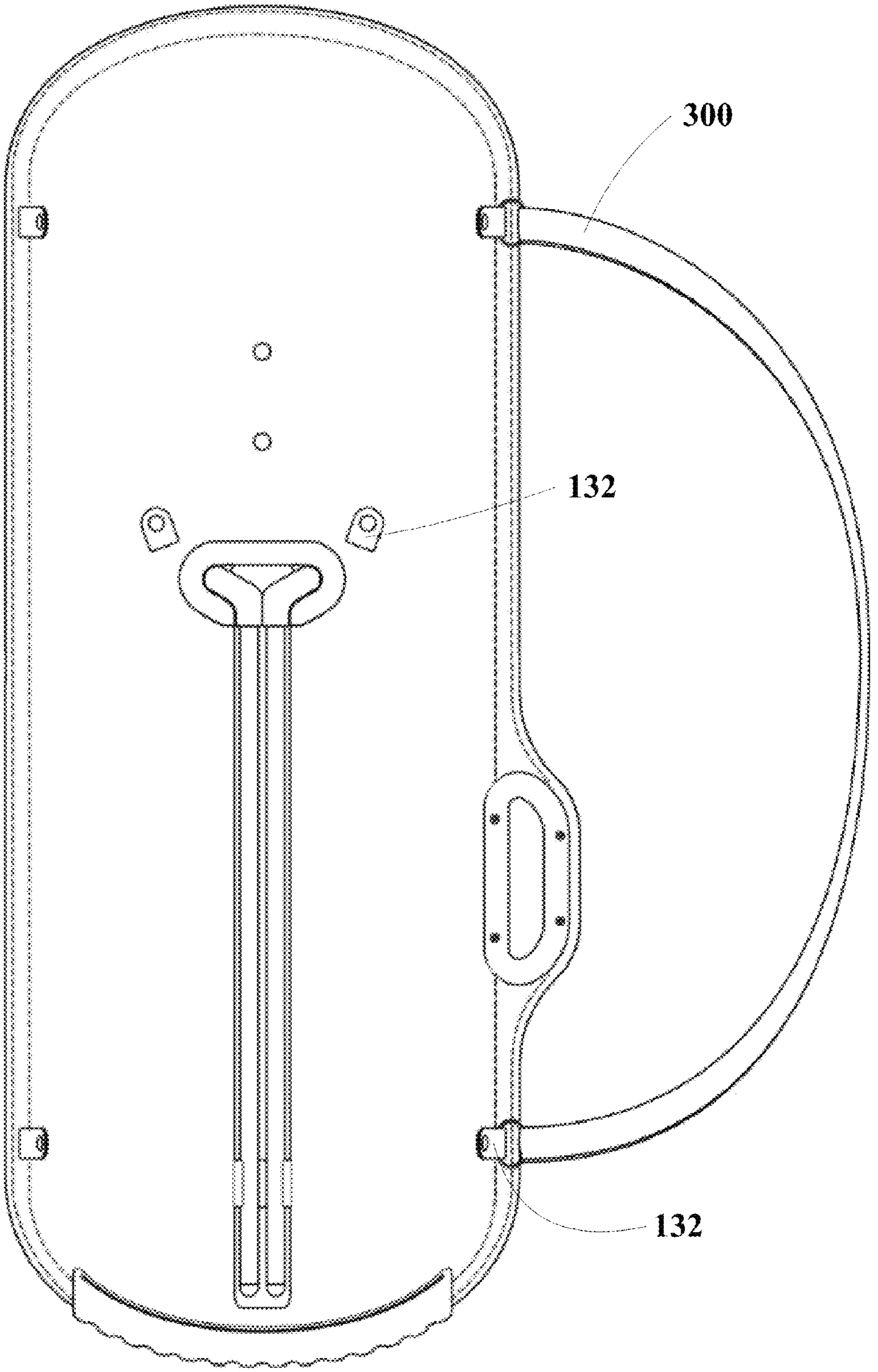
FIG. 24A presents an exemplary embodiment of the present disclosure with the inclusion of a removable strap.
Figure 24B:
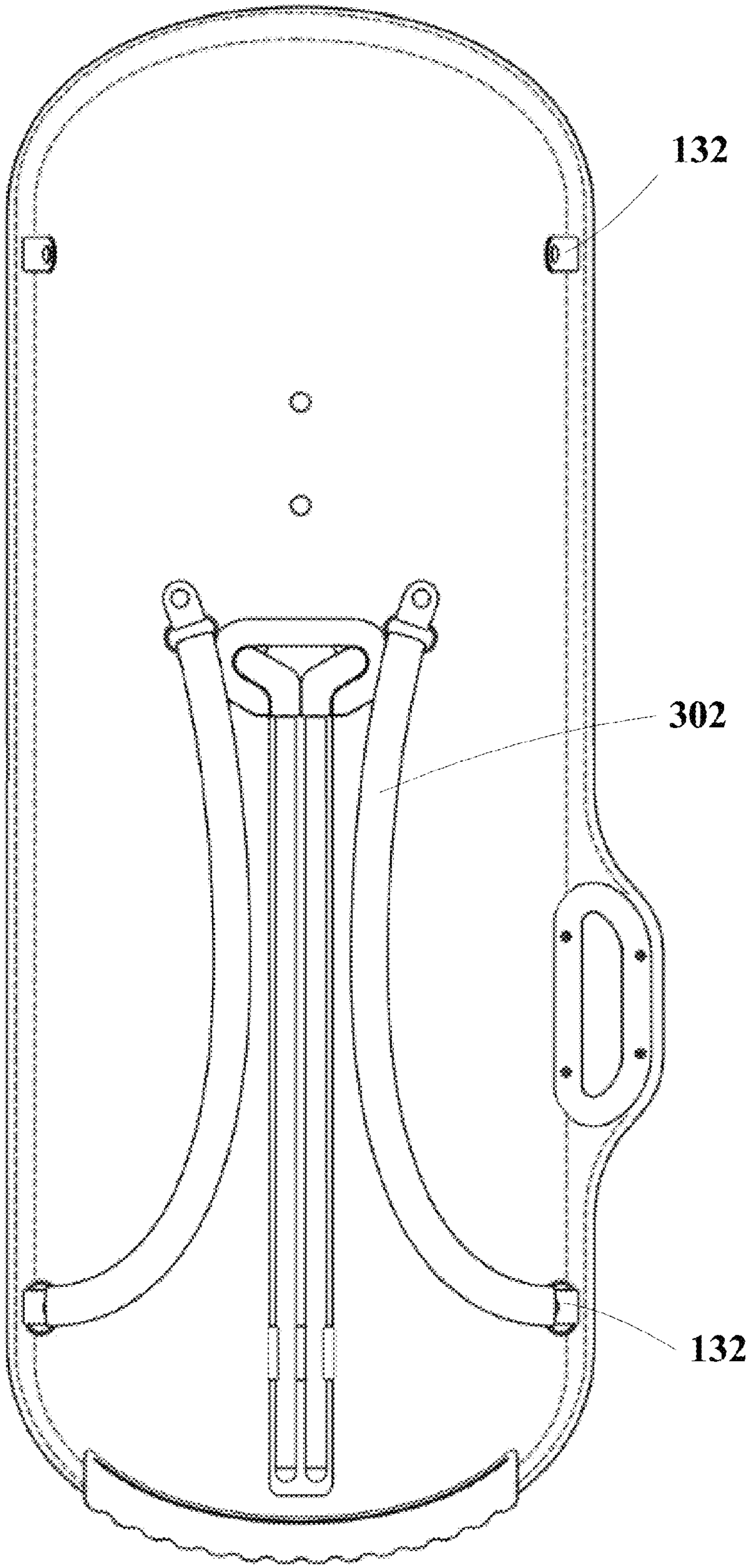
FIG. 24B presents an exemplary embodiment of the present disclosure with the inclusion of removable straps.

FIG. 24A presents an exemplary embodiment of the present disclosure with the inclusion of a removable strap 300. This embodiment is similar to the embodiment found in FIG. 13A, but includes a handle with reinforcement exterior layer 164. FIG. 24B presents an exemplary embodiment of the present disclosure with the inclusion of removable straps 302. This embodiment is similar to the embodiment found in FIG. 13B, but includes a handle with reinforcement exterior layer 164.

Figure 25:
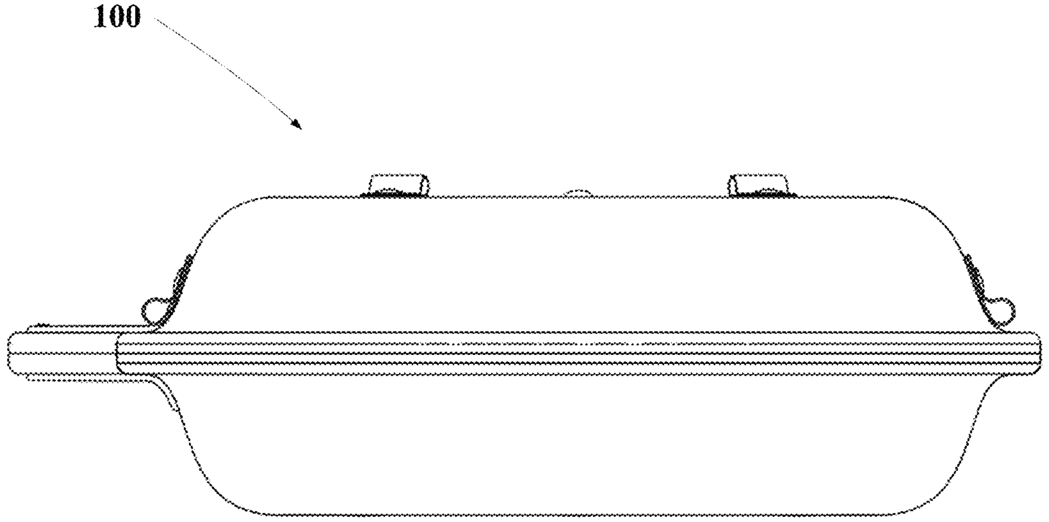
FIG. 25 presents an exemplary embodiment of the present disclosure from a top perspective.
Figure 26:
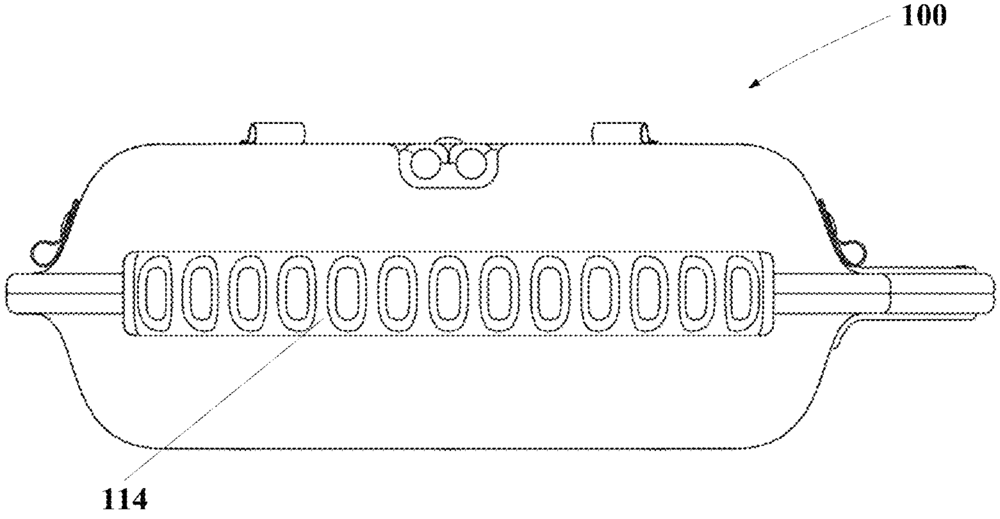
FIG. 26 presents an exemplary embodiment of the present disclosure from a bottom perspective.

FIG. 25 presents an exemplary embodiment of the present disclosure from a top perspective. FIG. 26 presents an exemplary embodiment of the present disclosure from a bottom perspective.

Figure 27:
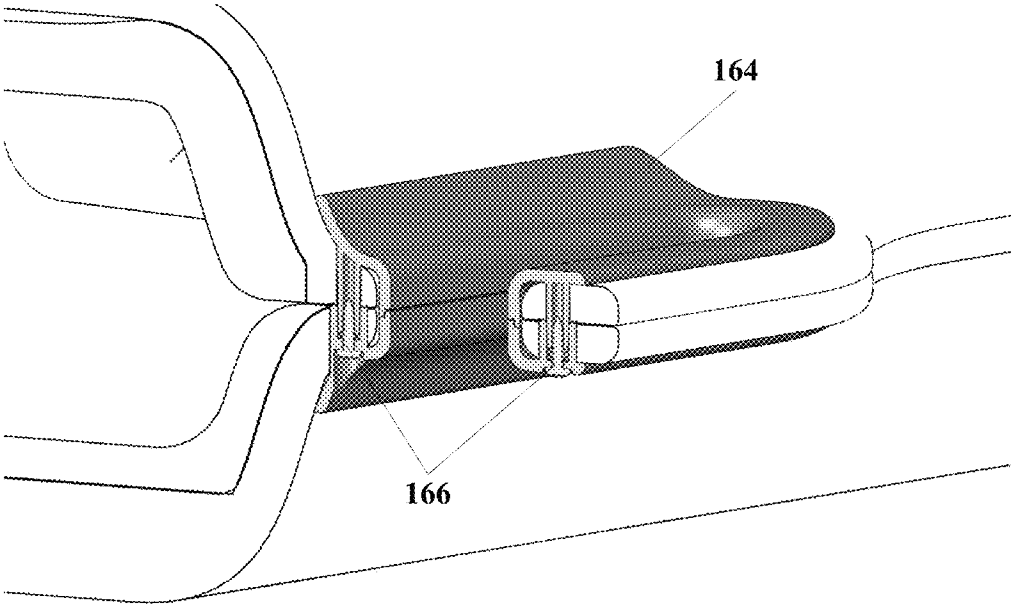
FIG. 27 presents an exemplary handle arrangement of an embodiment of the present disclosure.

FIG. 27 presents an exemplary handle arrangement of the present disclosure. As shown, some embodiments may include a reinforced handle 164 with the upper and lower sections of casing sandwiched and coupled 166 together by a reinforcement exterior layer 164.

Figure 28:
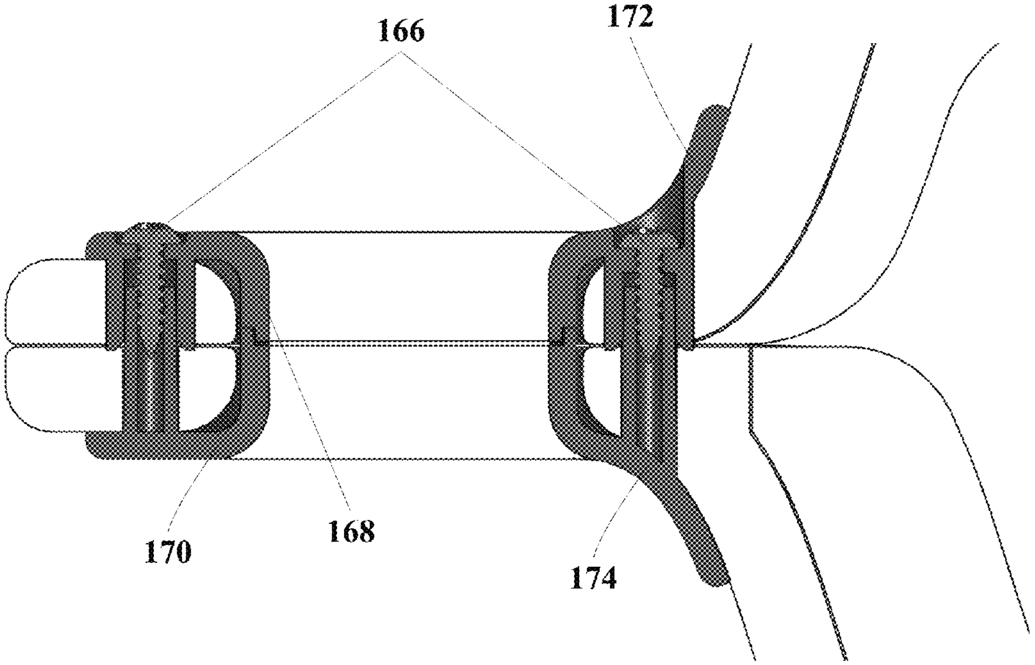
FIG. 28 presents an exemplary detailing of a handle arrangement of an embodiment of the present disclosure.

FIG. 28 presents a further exemplary handle arrangement of the present disclosure wherein the reinforcement layer includes two pieces. As shown, some embodiments may include a reinforced handle with the upper sections 168,172 and lower sections 170,174 of casing sandwiched and coupled 166 together by a reinforcement exterior layer 164.

Figure 29:
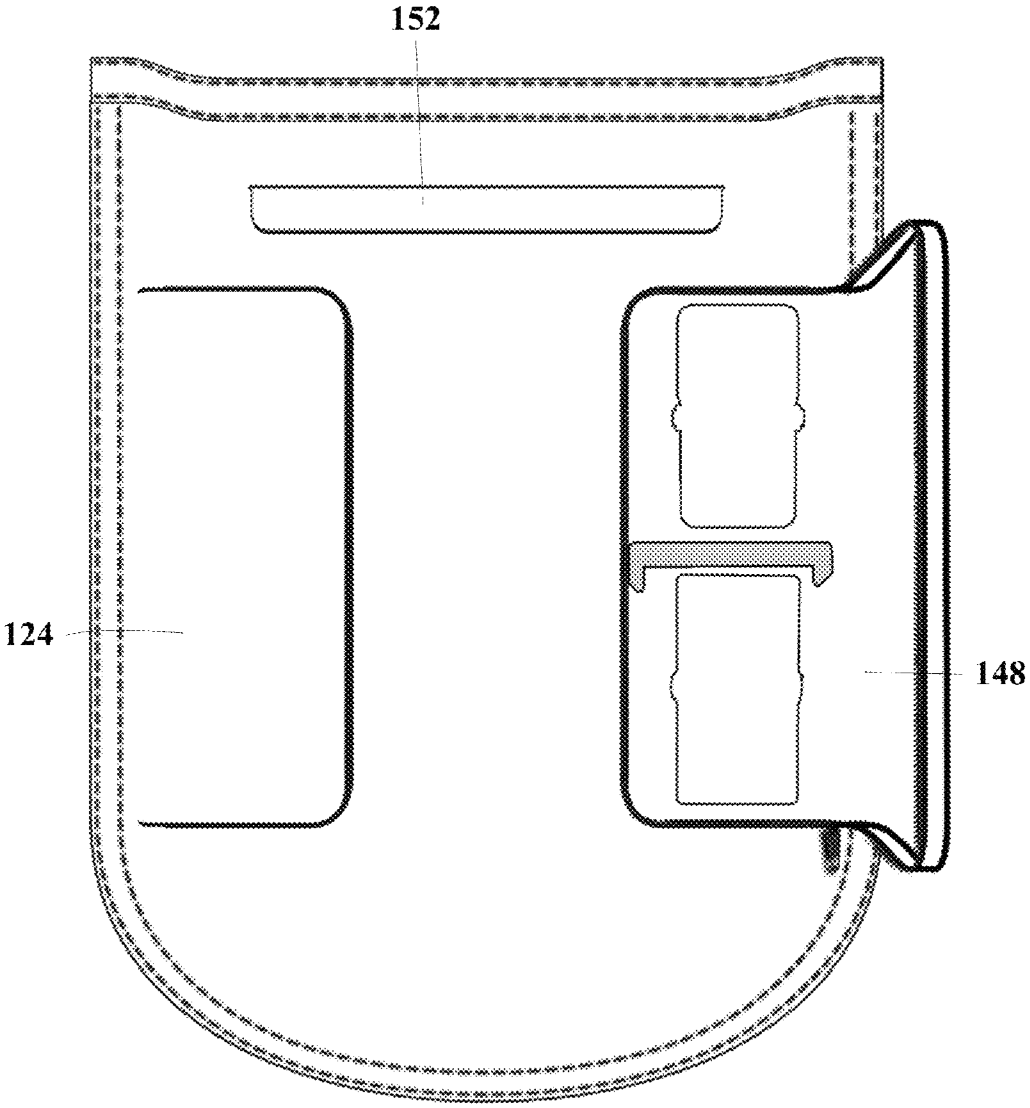
FIG. 29 presents an exemplary pocket arrangement for an embodiment of the present disclosure.
Figure 30:
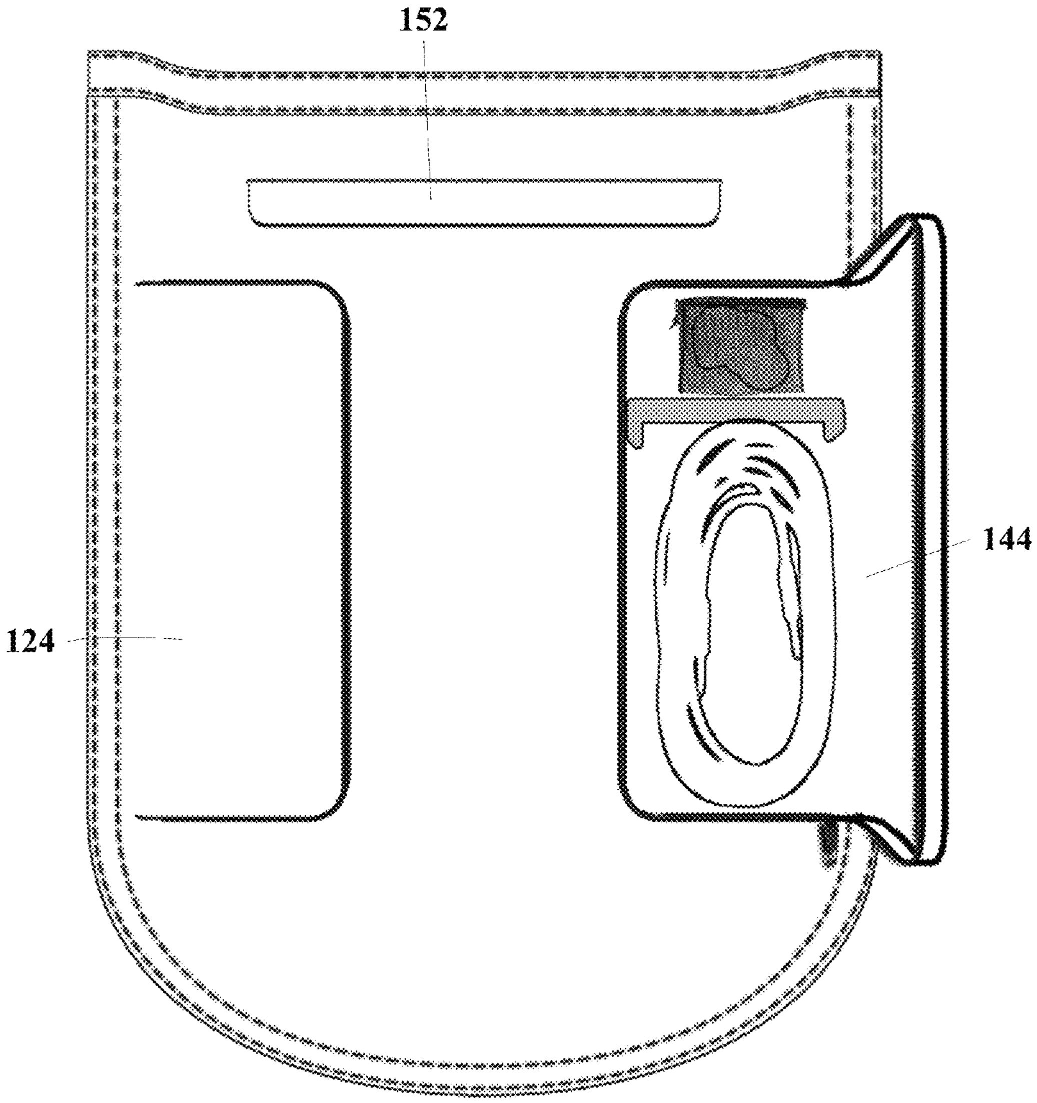
FIG. 30 presents an exemplary pocket arrangement for an embodiment of the present disclosure.
Figure 31:
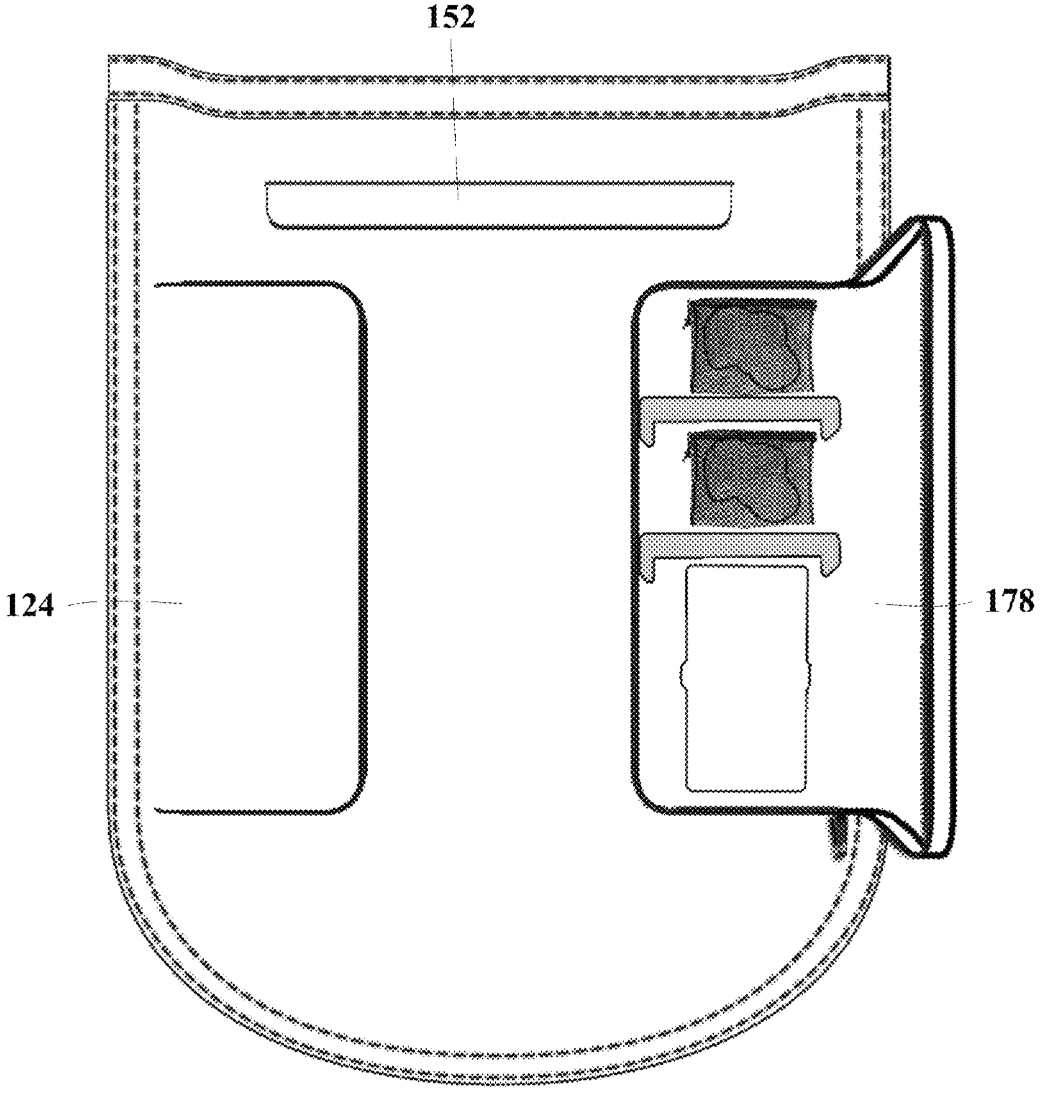
FIG. 31 presents an exemplary pocket arrangement for an embodiment of the present disclosure.
Figure 32:
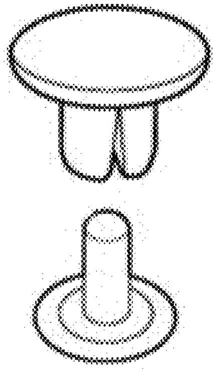
FIG. 32 presents an exemplary arrangement of a rivet connection as employed by embodiments of the disclosure.
Figure 33:
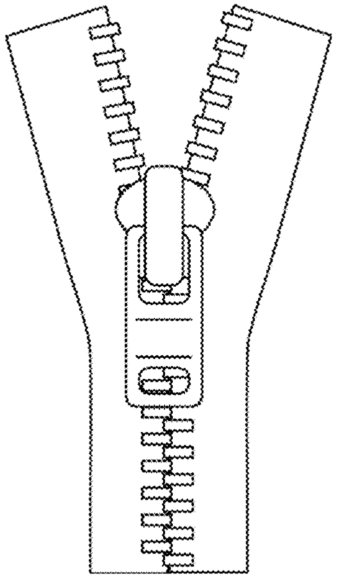
FIG. 33 presents and exemplary arrangement and structure of a zipper connection.
Figure 34:
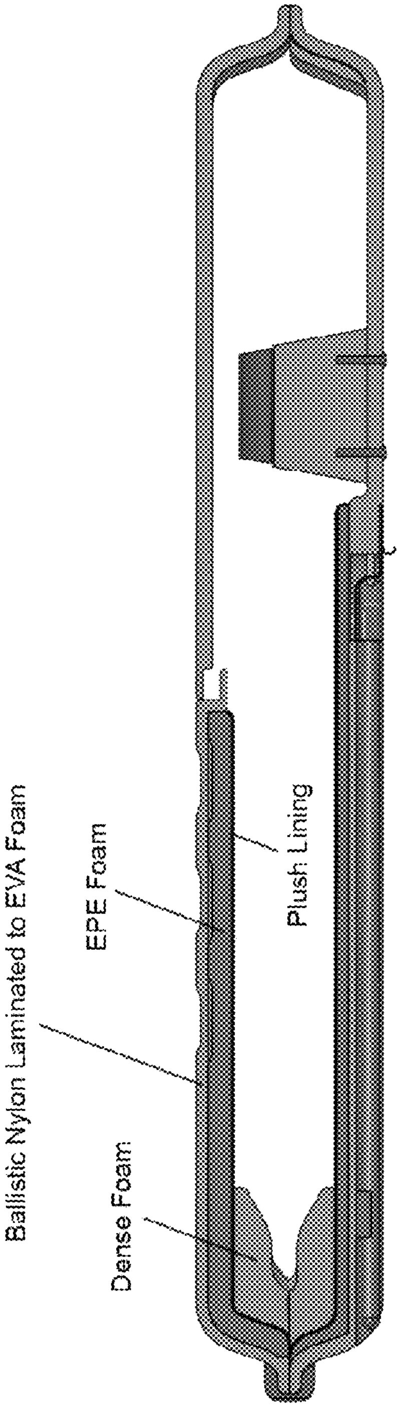
FIG. 34 presents an exemplary cross-section of a layered embodiment.

FIGS. 29 through 31 present exemplary arrangement of the internal storage. As shown, some embodiment of the present disclosure may include removable and relocatable internal partitions 124,144,148,178 that allow for the redimensioning of the internal storage.

Means for receiving and holding a portion of a neck of an instrument to a back portion may be neck holder 120 or neck restraint 160.

Means for receiving and holding a portion of said instrument within the interior enclosure may be the plush lining along the interior of the case 154, the foam bottom cap with U-profile 162, the lid 106, and/or other elements found within a case 100, performing the receiving and holding singularly or in combination.

In embodiments, the top portions of the legs 130 may exist in cavities and comprise protrusions. When pulled into an extended position, the top portions of the legs 130 may slide in an inward direction (each towards the other leg). The legs 130 may stop extending outward from the case when the protrusions of the top portions of the legs 130 meet a section of the hinge attachment 140. In this embodiment, the hinge attachment 140 may act as a wall to prevent the protrusions from moving outside of the cavities of the case 100. In embodiments, a keeper may prevent the protrusions from extending outside of the cavities (the hinge attachment 140 may act as a keeper). In embodiments such as this, the top portions rotate a distance and are then stopped by a keeper.

In embodiments, a width of the interior enclosure formed between a lower section of the case 100 and the back section 110 is greater than a width between the lid 106 and the back section 110.

In embodiments of the present disclosure, the apparatus is a semi-rigid universal instrument case with a unique rectangular oval shape. An exemplary embodiment intended for use with a solid body electric guitar may measure 41"×16"×4".

In a further embodiment of the present disclosure, the width of the lower section of the case may be wider than the width of the upper portion of this case. This difference in width may enable instruments to be more easily placed or retrieved from the case.

One embodiment may be an Airline Transit Authority, hereafter ATA, and/or Transportation Security Administration, hereafter TSA, compliant travel version. A further embodiment may be provided with luggage style roller wheels for added convenience during extensive touring and travel.

What is claimed is:

1. A portable case for the storage and transport of a musical instrument having an elongated neck extending from an enlarged body, in which the insertion or removal of the musical instrument can occur when the portable case is standing or prone, the portable case comprising:

a protective enclosure formed from a semi-rigid, lightweight material and having a substantially rectangular shape with semi-circular rounded ends along the longer dimension of said substantially rectangular shape, said protective enclosure having a depth commensurate to receive and protect the musical instrument when stored therein and comprising a back panel for forming a continuous rigid support base, a lower front panel, and an upper front lid;

said back panel, said upper front lid and said lower front panel each comprising a semi-rigid outer layer for providing outer protection for said protective enclosure and an inner layer interior to said outer layer for providing a surface for slidably receiving the musical instrument into a pre-determined location within said protective enclosure;

said lower front panel rigidly joined with a back panel along said cornerless periphery to form a rigid lower front portion and back portion of said protective enclosure;

a removable coupling for coupling said upper front lid to said back panel along said cornerless periphery for permitting detachment of said upper front lid from said back panel;

a hinge coupling for coupling said upper front lid to said lower front panel, thereby permitting said upper front lid to rotatably pivot about said hinge coupling and rest upon said lower front panel and, upon detachment of said upper front lid from said back panel, forming an opening in said portable case for receiving the enlarged body of the musical instrument; and a neck holder protruding from the interior of said protective enclosure for receiving and releasably holding the elongated neck of the musical instrument at a fixed position within the protective enclosure;

a handle formed integrally from said back panel and said lower front and positioned along a side of said protective enclosure for permitting the balanced lifting of said protective enclosure and thereby forming said portable case.

2. The portable case of claim 1, further comprising:

at least one supporting member rotatably connecting to at least a portion of said back panel via a hinge connection, said at least one supporting member transitions between a first position and a second position, said back panel comprises a recess sized for accommodating said at least one supporting member in said first position, and said at least one supporting member in said second position configured to extend from a base of said portable case thereby supporting said apparatus in a inclined position.

3. The portable case of claim 1, wherein said lid and at least a portion of said back panel comprise at least one storage compartment.

4. The portable case of claim 3, wherein arrangement of said at least one storage compartments is configurable.

5. The portable case of claim 1, wherein the case is configured for storage of a guitar.

6. The portable case of claim 1, wherein a zipper connection couples said back panel to said upper front lid.

7. The portable case of claim 1, wherein a rivet insert couples said lid to said lower section.

8. The portable case of claim 1, further comprising a black ballistic nylon outer covering.

9. The portable case of claim 1, further comprising a soft dense foam layer along at least a portion of the interior enclosure.

10. The portable case of claim 1, wherein a width of the interior enclosure formed between said lower front panel and said back panel is greater than a width between the upper front lid and said back panel.

11. The portable case of claim 1, further comprising at least one strap attachment configured to removably receive a removable strap.

12. The portable case of claim 11, wherein said strap attachment is configurable in a sling arrangement.

13. The apparatus of claim 11, wherein said strap attachment is configurable in a backpack arrangement.

14. The apparatus of claim 1, further comprising a reinforced handle.

15. The portable case of claim 1, further comprising a foam bottom cap.

16. The portable case of claim 1, further comprising slip lining on the interior faces.

17. The portable case of claim 16, further comprising structure along the slip lining for guiding the instrument into place when being stored.

18. The portable case of claim 1, wherein said recess comprises at least one clasp, wherein said clasp is configured to receive said at least one supporting member.

19. The portable case of claim 1, further comprising a non-slip rubber boot fitted to an exterior surface.

* * * * *